(12) United States Patent
Ngo et al.

(10) Patent No.: US 9,807,625 B2
(45) Date of Patent: *Oct. 31, 2017

(54) METHOD AND APPARATUS FOR USING TIME SHIFTED ANALYSIS BASED ON GATHERING NON-ENCRYPTED INFORMATION FROM PACKETS

(71) Applicant: Network Performance Research Group LLC, San Jose, CA (US)

(72) Inventors: Terry F K Ngo, Bellevue, WA (US); Seung Baek Yi, Norwich, VT (US); Erick Kurniawan, San Francisco, CA (US); Kun Ting Tsai, Fremont, CA (US)

(73) Assignee: NETWORK PERFORMANCE RESEARCH GROUP LLC, Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/454,805

(22) Filed: Mar. 9, 2017

(65) Prior Publication Data

US 2017/0181015 A1 Jun. 22, 2017

Related U.S. Application Data

(63) Continuation-in-part of application No. 15/259,386, filed on Sep. 8, 2016, which is a continuation-in-part (Continued)

(51) Int. Cl.
*H04L 12/28* (2006.01)
*H04W 24/02* (2009.01)
(Continued)

(52) U.S. Cl.
CPC ......... *H04W 24/02* (2013.01); *H04W 40/244* (2013.01); *H04W 84/12* (2013.01); *H04W 88/12* (2013.01)

(58) Field of Classification Search
USPC ......................................... 370/252, 329, 430
See application file for complete search history.

(56) References Cited

U.S. PATENT DOCUMENTS 5,978,669 A 11/1999 Sanmugam
6,181,952 B1 1/2001 Murata
(Continued)

FOREIGN PATENT DOCUMENTS

EP 2512169 A1 10/2012
EP 1925108 B1 3/2014
(Continued)

OTHER PUBLICATIONS

Office Action for U.S. Appl. No. 14/920,568, dated Mar. 29, 2016, 29 pages.
(Continued)

*Primary Examiner* — John Pezzlo
(74) *Attorney, Agent, or Firm* — Amin, Turocy & Watson, LLP

(57) ABSTRACT

The present invention relates to wireless networks and more specifically to systems and methods for selecting and implementing communication parameters used in a wireless network to optimize communication between access points and client devices while accounting for effects of adjacent networks. In one embodiment, the present invention includes a Wi-Fi coordinator device that receives packet information from devices within wireless range of the Wi-Fi coordinator. The Wi-Fi coordinator sends the packet information to a cloud intelligence engine which then time shifts the packet information and combines the packet information with other packet information. Using this integrated packet information, the cloud intelligence devices determines the access point settings to improve the operation of the network.

18 Claims, 16 Drawing Sheets

Related U.S. Application Data of application No. 15/225,966, filed on Aug. 2, 2016, which is a continuation of application No. 15/085,573, filed on Mar. 30, 2016, now Pat. No. 9,439,197.

(60) Provisional application No. 62/314,047, filed on Mar. 28, 2016, provisional application No. 62/203,383, filed on Aug. 10, 2015.

(51) Int. Cl.
*H04W 40/24* (2009.01)
*H04J 1/16* (2006.01)
*H04W 84/12* (2009.01)
*H04W 88/12* (2009.01)

(56) References Cited

U.S. PATENT DOCUMENTS

| | | | |
|---|---|---|---|
| 7,548,750 B2 | 6/2009 | Kruys et al. | |
| 7,606,193 B2 | 10/2009 | McFarland et al. | |
| 7,813,744 B2 | 10/2010 | Johnson | |
| 8,213,942 B2 | 7/2012 | Likar et al. | |
| 8,239,337 B2 | 8/2012 | Madani | |
| 8,260,357 B2 | 9/2012 | Likar et al. | |
| 8,472,334 B2 | 6/2013 | Likar et al. | |
| 8,483,059 B2 | 7/2013 | Likar et al. | |
| 8,565,106 B2 | 10/2013 | Likar et al. | |
| 8,654,782 B2 | 2/2014 | Meil et al. | |
| 8,699,341 B2 | 4/2014 | Likar et al. | |
| 8,867,490 B1 | 10/2014 | Krishna et al. | |
| 8,879,996 B2 | 11/2014 | Kenney et al. | |
| 8,885,511 B2 | 11/2014 | Likar et al. | |
| 9,060,289 B2 | 6/2015 | Chandrasekhar et al. | |
| 9,066,251 B2 | 6/2015 | Madan et al. | |
| 9,131,391 B2 | 9/2015 | Madan et al. | |
| 9,131,392 B2 | 9/2015 | Madan et al. | |
| 9,131,504 B2 | 9/2015 | Kenney et al. | |
| 9,439,197 B1 | 9/2016 | Ngo et al. | |
| 2002/0116380 A1 | 8/2002 | Chen et al. | |
| 2003/0107512 A1 | 6/2003 | McFarland et al. | |
| 2003/0181213 A1 | 9/2003 | Sugar et al. | |
| 2004/0033789 A1 | 2/2004 | Tsien | |
| 2004/0151137 A1 | 8/2004 | McFarland et al. | |
| 2004/0156336 A1 | 8/2004 | McFarland et al. | |
| 2004/0242188 A1 | 12/2004 | Uchida et al. | |
| 2005/0059364 A1 | 3/2005 | Hansen et al. | |
| 2005/0192016 A1 | 9/2005 | Zimmermann et al. | |
| 2005/0215266 A1* | 9/2005 | Tsien | H04W 16/14 455/454 |
| 2005/0272435 A1 | 12/2005 | Tsien et al. | |
| 2006/0082489 A1 | 4/2006 | Liu et al. | |
| 2007/0060065 A1 | 3/2007 | Kruys et al. | |
| 2008/0016556 A1 | 1/2008 | Selignan | |
| 2008/0089280 A1 | 4/2008 | Hu | |
| 2009/0077620 A1 | 3/2009 | Ravi et al. | |
| 2009/0116411 A1 | 5/2009 | Castagnoli et al. | |
| 2009/0160696 A1 | 6/2009 | Pare et al. | |
| 2009/0201851 A1 | 8/2009 | Kruys et al. | |
| 2010/0061289 A1 | 3/2010 | Mun et al. | |
| 2010/0216480 A1 | 8/2010 | Park et al. | |
| 2010/0271948 A1 | 10/2010 | Challapali et al. | |
| 2010/0302966 A1 | 12/2010 | Matsuura | |
| 2012/0258749 A1 | 10/2012 | Lenzini et al. | |
| 2012/0300759 A1 | 11/2012 | Patanapongpibul et al. | |
| 2013/0072106 A1 | 3/2013 | Koskela et al. | |
| 2013/0201928 A1 | 8/2013 | Kim et al. | |
| 2013/0252640 A1 | 9/2013 | Kenney et al. | |
| 2013/0314267 A1* | 11/2013 | Kenney | G01S 7/021 342/21 |
| 2014/0171060 A1 | 6/2014 | Cook et al. | |
| 2014/0253361 A1 | 9/2014 | Rezk et al. | |
| 2014/0301328 A1 | 10/2014 | Yacovitch | |
| 2014/0328286 A1 | 11/2014 | Crowle et al. | |
| 2014/0349669 A1 | 11/2014 | Qi et al. | |
| 2014/0362782 A1 | 12/2014 | Yuk et al. | |
| 2015/0023271 A1 | 1/2015 | Nakano | |
| 2015/0063321 A1 | 3/2015 | Sadek et al. | |
| 2015/0177720 A1* | 6/2015 | Anderson | G05B 15/02 700/90 |
| 2015/0189528 A1 | 7/2015 | Carbajal | |
| 2015/0208330 A1* | 7/2015 | Park | H04W 48/16 370/338 |
| 2015/0271829 A1 | 9/2015 | Amini et al. | |
| 2016/0014613 A1 | 1/2016 | Ponnampalam et al. | |
| 2016/0044673 A1 | 2/2016 | Liu et al. | |
| 2016/0157168 A1 | 6/2016 | Xue et al. | |
| 2016/0261657 A1 | 9/2016 | Bruhn et al. | |
| 2016/0345323 A1 | 11/2016 | Krishnamoorthy et al. | |
| 2017/0026845 A1 | 1/2017 | Garg et al. | |
| 2017/0041949 A1 | 2/2017 | Ngo et al. | |
| 2017/0041954 A1 | 2/2017 | Tsai et al. | |
| 2017/0079007 A1 | 3/2017 | Carbajal | |

FOREIGN PATENT DOCUMENTS

| | | |
|---|---|---|
| EP | 3128779 A1 | 2/2017 |
| WO | 2007032790 A2 | 3/2007 |
| WO | 2007032790 A3 | 4/2009 |
| WO | 2014176503 A1 | 10/2014 |
| WO | 2014190004 A1 | 11/2014 |

OTHER PUBLICATIONS

Office Action for U.S. Appl. No. 15/085,573, dated Jun. 24, 2016, 15 pages.

Notice of Allowance dated Jul. 19, 2016 for U.S. Appl. No. 15/085,573, 27 pages.

Office Action for U.S. Appl. No. 14/920,568, dated Sep. 30, 2016, 28 pages.

Extended European Search Report for EP Patent Application Serial No. 16182672.2, dated Dec. 16, 2016, 8 pages.

Office Action for U.S. Appl. No. 15/214,437 dated Jan. 23, 2017, 33 pages.

Extended European Search Report for EP Patent Application Serial No. 16187611.5, dated Jan. 30, 2017, 8 pages.

Office Action for U.S. Appl. No. 15/259,386, dated Jan. 9, 2017, 37 Pages.

Kerry et al., "Liaison Statement on the Compatibility Between IEEE 802.11a and Radars in the Radiolocation and Radionavigation Service in the 5250-5350 MHz and 5470-5725 MHz bands", Jan. 17, 2001, IEEE, 6 pages.

Office Action for U.S. Appl. No. 14/920,568, dated Jan. 20, 2017, 26 pages.

Extended European Search Report for EP Patent Application Serial No. 16182722.5, dated Dec. 15, 2016, 11 pages.

Office Action for U.S. Appl. No. 15/171,911, dated Feb. 28, 2017, 34 Pages.

Office Action for U.S. Appl. No. 15/263,985, dated Mar. 7, 2017, 33 Pages.

Notice of Allowance dated Apr. 12, 2017 for U.S. Appl. No. 15/171,911, 30 pages.

European Office Action dated Feb. 13, 2017 for European Application Serial No. 16182722.5, 2 pages.

Office Action for U.S. Appl. No. 15/428,658, dated May 10, 2017, 20 pages.

Office Action for U.S. Appl. No. 15/416,568, dated May 18, 2017, 39 pages.

Extended European Search Report for EP Patent Application 16200660.5, dated May 8, 2017, 6 pages.

Office Action for U.S. Appl. No. 14/920,568 dated Jun. 16, 2017, 51 pages.

Office Action for U.S. Appl. No. 15/225,966 dated Jul. 7, 2017, 37 pages.

Office Action for U.S. Appl. No. 15/259,386 dated Jul. 6, 2017, 43 pages.

Office Action for U.S. Appl. No. 15/588,474 dated Jul. 11, 2017, 21 pages.

Office Action for U.S. Appl. No. 15/483,406 dated Aug. 4, 2017, 29 pages.

(56) References Cited

OTHER PUBLICATIONS

European Search Report for European Application Serial No. 17163289.6 dated Jul. 12, 2017, 11 pages.
Holma, et al., "LTE for UMTS. Evolution to LTE-advanced, " Mar. 4, 2011, pp. 26-29, XP055386245.
Office Action for U.S. Appl. No. 15/450,940 dated Aug. 10, 2017, 28 pages.

\* cited by examiner

METHOD AND APPARATUS FOR USING TIME SHIFTED ANALYSIS BASED ON GATHERING NON-ENCRYPTED INFORMATION FROM PACKETS

CROSS REFERENCE TO RELATED APPLICATIONS

This application claims priority to U.S. Provisional Patent Application No. 62/314,047 titled METHOD AND APPARATUS FOR DIRECTED ADAPTIVE CONTROL OF ACCESS POINT-TO-CLIENT INTERACTION IN WIRELESS NETWORKS and filed on Mar. 28, 2016, the disclosure of which is hereby incorporated herein by reference in its entirety. This application is a continuation-in-part of, and claims priority to, U.S. patent application Ser. No. 15/259,386 titled "METHOD AND APPARATUS FOR DIRECTED ADAPTIVE CONTROL OF ACCESS POINT-TO-CLIENT INTERACTION IN WIRELESS NETWORKS" and filed on Sep. 8, 2016, which application is a continuation-in-part of, and claims priority to, U.S. patent application Ser. No. 15/225,966 titled "METHOD AND APPARATUS FOR DIRECTED ADAPTIVE CONTROL OF DYNAMIC CHANNEL SELECTION IN WIRELESS NETWORKS" and filed on Aug. 2, 2016, which is a continuation of U.S. patent application Ser. No. 15/085,573 titled "METHOD AND APPARATUS FOR DIRECTED ADAPTIVE CONTROL OF DYNAMIC CHANNEL SELECTION IN WIRELESS NETWORKS" and filed on Mar. 30, 2016, which claims priority to U.S. Provisional Patent Application No. 62/203,383 titled "METHOD AND APPARATUS FOR DIRECTED ADAPTIVE CONTROL OF DYNAMIC CHANNEL SELECTION IN WIRELESS NETWORKS" and filed on Aug. 10, 2015. The entireties of the foregoing applications listed herein are hereby incorporated by reference.

BACKGROUND

The present invention relates to wireless networks and more specifically to systems and methods for using time shifted packet analysis to select and implement communication parameters in an access point to optimize the interaction between the access point and client devices while accounting for the effects of adjacent Wi-Fi devices.

Wi-Fi networks are crucial to today's portable modern life. Wi-Fi is the preferred network in the growing Internet-of-Things (IoT). But, the technology behind current Wi-Fi has changed little in the last ten years. For example, the Wi-Fi network and the associated unlicensed spectrum are currently managed in inefficient ways. Such networks generally employ primitive control algorithms that assume the network consists of "self-managed islands," a concept originally intended for low density and low traffic environments. Further, there is little or no coordination between individual networks and equipment from different manufacturers or the client devices attached to the networks and adjacent networks. Because of this, networks often do not operate at their peak capacity. For example, many Wi-Fi networks operate on crowded channels or otherwise have interference from adjacent devices, but lack the ability to detect congestion and collisions and to correct access point settings to improve network throughput.

These situations are often worse in home networks than in enterprise networks since home networks are generally assembled in completely chaotic ad hoc ways. With more and more connected devices becoming commonplace, the net result is growing congestion and slowed networks with unreliable connections. Similarly, LTE-U networks operating in the same or similar unlicensed bands as 802.11ac/n Wi-Fi suffer similar congestion and unreliable connection issues and will often create congestion and performance problems for existing Wi-Fi networks sharing the same channels.

One way to ameliorate Wi-Fi and LTE-U device congestion has been to open up certain parts of the 5 GHz U-NII-2 band, known as the DFS band, to Wi-Fi use. Devices operating in the DFS band require active radar detection. This function is assigned to a device capable of detecting radar known as a DFS master, which is typically an access point or router. The DFS master actively scans the DFS channels and performs a channel availability check (CAC) and periodic in-service monitoring (ISM) after the channel availability check. The channel availability check lasts 60 seconds as required by the FCC Part 15 Subpart E and ETSI 301 893 standards. The DFS master signals to the other devices in the network (typically client devices) by transmitting a DFS beacon indicating that the channel is clear of radar. Although the access point can detect radar, wireless clients typically cannot. Because of this, wireless clients must first passively scan DFS channels to detect whether a beacon is present on that particular channel. During a passive scan, the client device switches through channels and listens for a beacon transmitted at regular intervals by the access point on an available channel.

Once a beacon is detected, the client is allowed to actively transmit on that channel. If the DFS master detects radar in that channel, the DFS master no longer transmits the beacon, and all client devices upon not sensing the beacon within a prescribed time must vacate the channel immediately and remain off that channel for 30 minutes. For clients associated with the DFS master network, additional information in the beacons (i.e. the channel switch announcement) can trigger a rapid and controlled evacuation of the channel. Normally, a DFS master device is an access point with only one radio and is able to provide DFS master services for just a single channel.

Prior systems and methods have significant down time when providing DFS master services. Further, they do not address network inefficiencies resulting from the lack of coordination and optimization between network access points, client devices, and adjacent Wi-Fi devices. This disclosure recognizes and addresses, in at least certain embodiments, these problems.

SUMMARY

The present invention relates to wireless networks and more specifically to systems and methods for using time shifted packet analysis to select and implement communication parameters in an access point to optimize the interaction between the access point and client devices while accounting for the effects of adjacent Wi-Fi devices. Adjacent Wi-Fi devices are those that are within Wi-Fi range of the access point and/or devices connected to the access point but are not part of the same network as the access point. The present invention employs a wireless agility agent that includes a Wi-Fi coordinator (or LTE-U coordinator) to allow for selecting and implementing communication parameters in access points to optimize network operation. The coordinator collects packet information on behalf of the cloud intelligence engine and then coordinates the delivery and enforcement of operating parameters to access points. The agility agent may also contain a DFS master that provides access to additional bandwidth for wireless networks, such as IEEE 802.11ac/n networks. The additional bandwidth is derived from channels that require avoidance of channels with occupying signals. For example, additional bandwidth is derived from special compliance channels that require radar detection, such as the DFS channels of the U-NII-2 bands, by employing multi-channel radar detection and in-service monitoring, and active channel selection controls.

In one embodiment, the present invention utilizes an agility agent that includes a Wi-Fi coordinator device. The Wi-Fi coordinator device in the agility agent receives packet information from devices within wireless range of the Wi-Fi coordinator. The Wi-Fi coordinator sends the packet information to a cloud intelligence engine. The cloud intelligence engine then time shifts the packet information and combines the packet information with additional stored packet information—which the cloud intelligence engine has stored or retrieves from other sources. Using this information, the cloud intelligence device determines the access point settings that would improve the operation of the network.

Other embodiments and various examples, scenarios and implementations are described in more detail below. The following description and the drawings set forth certain illustrative embodiments of the specification. These embodiments are indicative, however, of but a few of the various ways in which the principles of the specification may be employed. Other advantages and novel features of the embodiments described will become apparent from the following detailed description of the specification when considered in conjunction with the drawings.

BRIEF DESCRIPTION OF THE DRAWINGS

The aforementioned objects and advantages of the present invention, as well as additional objects and advantages thereof, will be more fully understood herein after as a result of a detailed description of a preferred embodiment when taken in conjunction with the following drawings in which.

DETAILED DESCRIPTION

Figure 1:
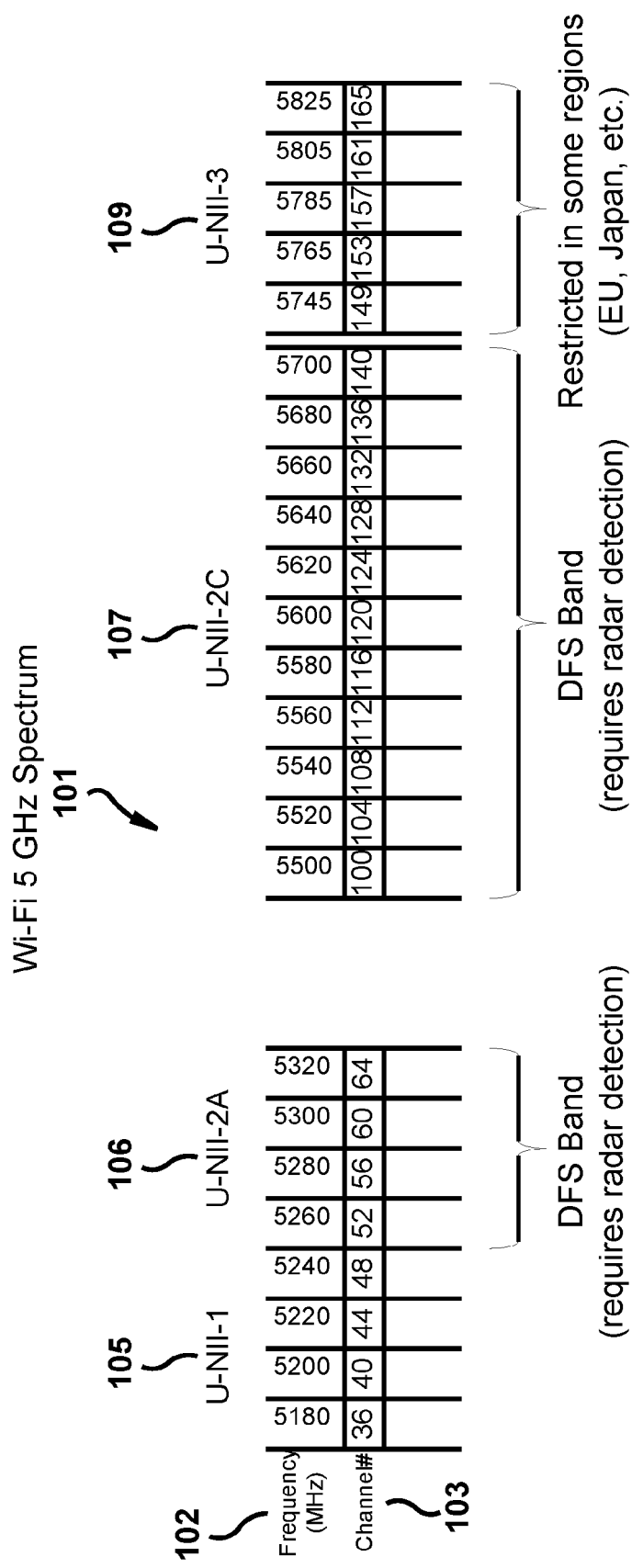
FIG. 1 illustrates portions of the 5 GHz Wi-Fi spectrum including portions that require active monitoring for radar signals.

The present invention relates to wireless networks and more specifically to systems and methods for using time shifted packet analysis to select and implement communication parameters in an access point to optimize the interaction between the access point and client devices while accounting for the effects of adjacent Wi-Fi devices. The present invention employs a wireless agility agent that includes a Wi-Fi coordinator to allow for selecting and implementing communication parameters in access points to improve network operation. The coordinator collects information on behalf of the cloud intelligence engine and then coordinates the delivery and enforcement of operating parameters to access points. The agility agent may also contain a DFS master that provides access to access additional bandwidth for wireless networks, such as IEEE 802.11ac/n networks. The additional bandwidth is derived from channels that require avoidance of channels with occupying signals. For example, additional bandwidth is derived from special compliance channels that require radar detection, such as the DFS channels of the U-NII-2 bands, by employing multi-channel radar detection and in-service monitoring, and active channel selection controls.

In accordance with an implementation of the present invention, a system includes an agility agent that includes a Wi-Fi coordinator device. The Wi-Fi coordinator device in the agility agent receives packet information from devices within range of the Wi-Fi coordinator. The devices may be connected to the access point, or they may not be. The Wi-Fi coordinator sends the packet information to a cloud intelligence engine. The cloud intelligence engine then stores and combines the packet information with other packet information—which the cloud intelligence engine has stored or retrieves from other sources—to generate integrated packet information. Using this integrated packet information, the cloud intelligence devices determines the access point settings that would optimize the operation of the network.

In accordance with another implementation of the present invention, a method includes using a Wi-Fi coordinator device to receive packet information from one or more devices within wireless range of the Wi-Fi coordinator device. The method further includes using a cloud intelligence engine to receive the packet information, time shift the packet information, integrate the packet information with other packet information to generate integrated packet information, and determine one or more operational Wi-Fi settings for the access point device based at least on the integrated packet information.

In accordance with yet another implementation of the present invention, a system includes an access point, a Wi-Fi coordinator device, and a cloud intelligence engine. The Wi-Fi coordinator device is communicatively coupled to the access point and configured to receive packet information from one or more devices in range of the Wi-Fi coordinator device. The cloud intelligence engine is communicatively coupled to the Wi-Fi coordinator device and configured to receive the packet information, time shift the packet information, and integrate the packet information with other packet information to generate integrated packet information. The cloud intelligence engine is also configured to determine one or more operational Wi-Fi settings for the access point device based at least on the integrated packet information.

Wi-Fi channels available for network communication currently include portions of the 2.4 GHz Wi-Fi spectrum and the 5 GHz Wi-Fi spectrum. FIG. 1 illustrates portions of the 5 GHz Wi-Fi spectrum 101. FIG. 1 shows frequencies 102 and channels 103 that make up portions of the 5 GHz Wi-Fi spectrum 101. The channels 103 of the GHz Wi-Fi spectrum 101 may be a plurality of 5 GHz communication channels (e.g., a plurality of 5 GHz radio channels). AU-NII band is an FCC regulatory domain for 5-GHz wireless devices and is part of the radio frequency spectrum used by IEEE 802.11ac/n devices and by many wireless internet service providers. The U-NII band operates over four ranges. For example, aU-NII-1 band 105 covers the 5.15-5.25 GHz range of the 5 GHz Wi-Fi spectrum 101, a U-NII-2A band 106 covers the 5.25-5.35 GHz range of the 5 GHz Wi-Fi spectrum 101, a U-NII-2C band 107 covers the 5.47-5.725 GHz range of the 5 GHz Wi-Fi spectrum 101, and a U-NII-3 band 109 covers the 5.725-5.850 GHz range of the 5 GHz Wi-Fi spectrum 101. The U-NII-2A band 106 is subject to DFS radar detection and avoidance requirements. The U-NII-2C band 107 is also subject to DFS radar detection and avoidance requirements. Use of the U-NII-3 band 109 is restricted in some jurisdictions like the European Union and Japan.

When used in an 802.11ac/n or LTE-U wireless network, an agility agent of the present invention functions as an autonomous DFS master device. In contrast to conventional DFS master devices, the agility agent is not an access point or router, but rather the agility agent is a standalone wireless device employing inventive scanning techniques described herein that provide DFS scan capabilities across multiple channels, enabling one or more access point devices and peer-to-peer client devices to exploit simultaneous multiple DFS channels. The agility agent of the present invention may be incorporated into another device such as an access point, LTE-U host, base station, cell, or small cell, media or content streamer, speaker, television, mobile phone, mobile router, software access point device, or peer to peer device but does not itself provide network access to client devices. In particular, in the event of a radar event or a false-detect, the enabled access point and clients or wireless device are able to move automatically, predicatively and very quickly to another DFS channel.

Figure 2:
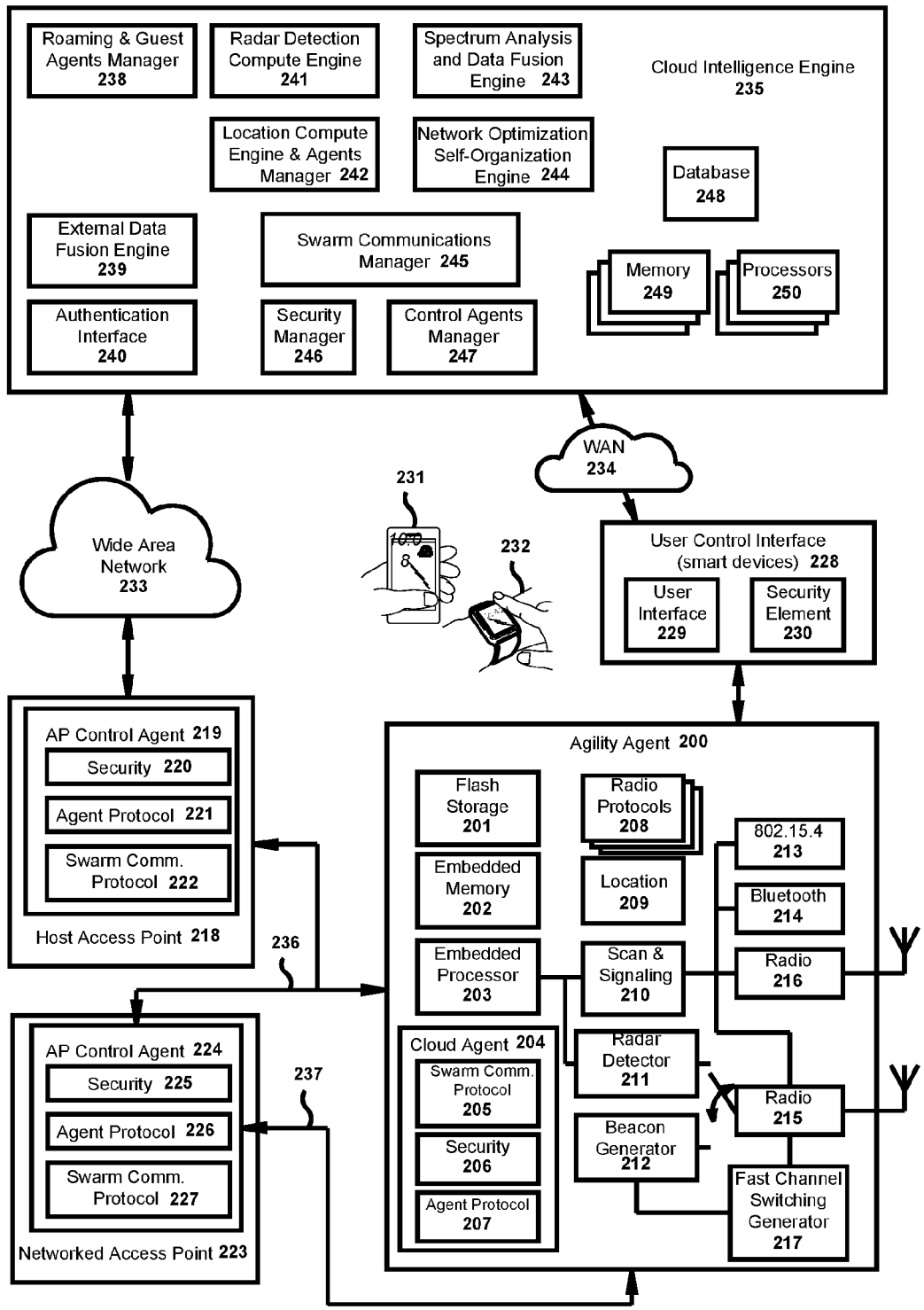
FIG. 2 illustrates how such an exemplary agility agent may interface with a conventional host access point, a cloud-based intelligence engine, and client devices in accordance with the present invention.

FIG. 2 provides a detailed illustration of an exemplary system of the present invention. As illustrated in FIG. 2, an agility agent 200, in the role of an autonomous DFS master device, may control at least one access point (e.g., a host access point 218) to dictate selection of a channel (e.g., a communication channel associated with the 5 GHz Wi-Fi spectrum 101) for the at least one access point. In one example, the agility agent 200 may be an agility agent device. In another example, the agility agent 200 may be a DFS device (e.g., an autonomous DFS master device, a standalone multi-channel DFS master, etc.). The agility agent 200 may dictate selection of a channel for the at least one access point (e.g., the host access point 218) based on information provided to and/or received from a cloud intelligence engine 235. For example, the agility agent 200 may be an agility agent device in communication with the host access point device 218. Furthermore, the agility agent 200 may generate spectral information associated with a plurality of 5 GHz communication channels (e.g., a plurality of 5 GHz communication channels associated with the 5 GHz Wi-Fi spectrum 101) for the host access point device 218. The cloud intelligence engine 235 may be a device (e.g. a cloud intelligence engine) that receives the spectral information via a wide area network 233 (e.g. via a network device associated with the wide area network 233). Furthermore, the cloud intelligence engine 235 may integrate the spectral information with other spectral information associated with other host access point devices (e.g., other access point devices 223) to generate integrated spectral information. Then, the cloud intelligence engine 235 may determine a communication channel (e.g., a communication channel from the plurality of 5 GHz communication channels associated with the 5 GHz Wi-Fi spectrum 101) for the host access point device 218 and based at least on the integrated spectral information.

In an aspect, the agility agent 200 may dictate channel selection by (a) signaling availability of one or more DFS channels by simultaneous transmission of one or more beacon signals; (b) transmitting a listing of both the authorized available DFS channels, herein referred to as a whitelist, and the prohibited DFS channels in which a potential radar signal has been detected, herein referred to as a blacklist, along with control signals and a time-stamp signal, herein referred to as a dead-man switch timer via an associated non-DFS channel; (c) transmitting the same signals as (b) over a wired medium such as Ethernet or serial cable; and (d) receiving control, coordination and authorized and preferred channel selection guidance information from the cloud intelligence engine 235. The agility agent 200 sends the time-stamp signal, or dead-man switch timer, with communications to ensure that the access points 218, 223 do not use the information, including the whitelist, beyond the useful lifetime of the information. For example, a whitelist will only be valid for certain period of time. The time-stamp signal avoids using noncompliant DFS channels by ensuring that an access point will not use the whitelist beyond its useful lifetime. The present invention allows currently available 5 GHz access points without radar detection—which cannot operate in the DFS channels—to operate in the DFS channels by providing the radar detection required by the FCC or other regulatory agencies.

The host access point 218 and any other access point devices 223 under control of the agility agent 200 typically have an access point control agent portion 219, 224 installed within respective communication stacks. The access point control agent 219, 224 is an agent that acts under the direction of the agility agent 200 to receive information and commands from the agility agent 200. The access point control agent 219, 224 acts on information from the agility agent 200. For example, the access point control agent 219, 224 listens for information like a whitelist or blacklist from the agility agent. If a radar signal is detected by the agility agent 200, the agility agent 200 communicates that to the access point control agent 219, 224, and the access point control agent 219, 224 acts to evacuate the channel within a certain time interval (e.g., immediately). The control agent can also take commands from the agility agent 200. For example, the host access point 218 and network access point 223 can offload DFS monitoring to the agility agent 200 as long as they can listen to the agility agent 200 and take commands from the agility agent regarding available DFS channels.

The host access point 218 is connected to the wide area network 233 and includes the access point control agent 219 to facilitate communications with the agility agent 200. The access point control agent 219 includes a security module 220 and agent protocols 221 to facilitate communication with the agility agent 200, and swarm communication protocols 222 to facilitate communications between agility agents, access points, client devices and/or other devices in the network. The agility agent 200 connects to the cloud intelligence engine 235 via the host access point 218 and the wide area network 233. The host access point 218 may set up a secure communications tunnel to communicate with the cloud intelligence engine 235 through, for example, an encrypted control API in the host access point 218. The agility agent 200 may transmit (e.g., though the secure communications tunnel) the spectral information to the cloud intelligence engine 235. The spectral information may include information such as, for example, a whitelist (e.g., a whitelist of each of the plurality of 5 GHz communication channels associated with the 5 GHz Wi-Fi spectrum 101 that does not contain a radar signal), a blacklist (e.g., a blacklist of each of the plurality of 5 GHz communication channels associated with the 5 GHz Wi-Fi spectrum 101 that contains a radar signal), scan information associated with a scan for a radar signal in the plurality of 5 GHz communication channels associated with the 5 GHz Wi-Fi spectrum 101, state information, location information associated with the agility agent device and/or the access point device, time signals, scan lists (e.g., scan lists showing neighboring access points, etc.), congestion information (e.g., number of re-try packets, type of re-try packets, etc.), traffic information, other channel condition information, and/or other spectral information. The cloud intelligence engine 235 may combine the spectral information with other spectral information (e.g., other spectral information associated with agility agent(s) 251) to generate combined spectral information. Then, the cloud intelligence engine 235 may determine a particular communication channel (e.g., a particular communication channel associated with the 5 GHz Wi-Fi spectrum 101) and may communicate the particular communication channel to the agility agent 200 (e.g., via the secure communications tunnel). Additionally or alternatively, the cloud intelligence engine 235 may communicate other information to the agility agent 200 (e.g., via the secure communications tunnel) such as, for example, access point location (including neighboring access points), access point/cluster current state and history, statistics (including traffic, congestion, and throughput), whitelists, blacklists, authentication information, associated client information, regional information, regulatory information and/or other information. The agility agent 200 uses the information from the cloud intelligence engine 235 to control the host access point 218, other access points and/or other network devices.

The agility agent 200 may communicate via wired connections or wirelessly with the other network components. In the illustrated example, the agility agent 200 includes a primary radio 215 and a secondary radio 216. The primary radio 215 is for DFS and radar detection. The primary radio 215 is typically a 5 GHz radio. In one example, the primary radio 215 can be a 5 GHz transceiver. The agility agent 200 may receive radar signals, traffic information, and/or congestion information through the primary radio 215. And the agility agent 200 may transmit information, such as DFS beacons, via the primary radio 215. The secondary radio 216 is a secondary radio for sending control signals to other devices in the network. The secondary radio 216 is typically a 2.4 GHz radio. The agility agent 200 may receive information such as network traffic, congestion, and/or control signals with the secondary radio 216. And the agility agent 200 may transmit information, such as control signals, with the secondary radio 216. The primary radio 215 is connected to a fast channel switching generator 217 that includes a switch and allows the primary radio 215 to switch rapidly between a radar detector 211 and beacon generator 212. The fast channel switching generator 217 allows the radar detector 211 to switch sufficiently fast to appear to be on multiple channels at a time.

In one embodiment, a standalone multi-channel DFS master (e.g., the agility agent 200) includes a beacon generator 212 to generate a beacon in each of a plurality of 5 GHz radio channels (e.g., a plurality of 5 GHz radio channels associated with the 5 GHz Wi-Fi spectrum 101), a radar detector 211 to scan for a radar signal in each of the plurality of 5 GHz radio channels, a 5 GHz radio transceiver (e.g., the primary radio 215) to transmit the beacon in each of the plurality of 5 GHz radio channels and to receive the radar signal in each of the plurality of 5 GHz radio channels, and a fast channel switching generator 217 coupled to the radar detector, the beacon generator, and the 5 GHz radio transceiver. The fast channel switching generator 217 switches the 5 GHz radio to a first channel of the plurality of 5 GHz radio channels and then causes the beacon generator 212 to generate the beacon in the first channel of the plurality of 5 GHz radio channels. Then, the fast channel switching generator 217 causes the radar detector 211 to scan for the radar signal in the first channel of the plurality of 5 GHz radio channels. The fast channel switching generator 217 then repeats these steps for each other channel of the plurality of 5 GHz radio channels during a beacon transmission duty cycle and, in some examples, during a radar detection duty cycle. The beacon transmission duty cycle is the time between successive beacon transmissions on a given channel and the radar detection duty cycle which is the time between successive scans on a given channel. Because the agility agent 200 cycles between beaconing and scanning in each of the plurality of 5 GHz radio channels in the time window between a first beaconing and scanning in a given channel and a subsequent beaconing and scanning the same channel, it can provide effectively simultaneous beaconing and scanning for multiple channels.

The agility agent 200 also may contain a Bluetooth radio 214 and/or an 802.15.4 radio 213 for communicating with other devices in the network. The agility agent 200 may include various radio protocols 208 to facilitate communication via the included radio devices.

The agility agent 200 may also include a location module 209 to geolocate or otherwise determine the location of the agility agent 200. As shown in FIG. 2, the agility agent 200 may include a scan and signaling module 210. The agility agent 200 includes embedded memory 202, including for example flash storage 201, and an embedded processor 203. The cloud agent 204 in the agility agent 200 facilitates aggregation of information from the cloud agent 204 through the cloud and includes swarm communication protocols 205 to facilitate communications between agility agents, access points, client devices, and other devices in the network. The cloud agent 204 also includes a security module 206 to protect and secure the cloud communications of the agility agent 200, as well as agent protocols 207 to facilitate communication with the access point control agents 219, 224.

As shown in FIG. 2, the agility agent 200 may control other access points, for example networked access point 223, in addition to the host access point 218. The agility agent 200 may communicate with the other access points 223 via a wired or wireless connection 236, 237. The other access points 223 include an access point control agent 224 to facilitate communication with the agility agent 200 and other access points. The access point control agent 224 includes a security module 225, agent protocols 226 and swarm communication protocols 227 to facilitate communications with other agents (including other access points and client devices) on the network.

The cloud intelligence engine 235 includes a database 248 and memory 249 for storing information from the agility agent 200, one or more other agility agents (e.g., the agility agent(s) 251) connected to the cloud intelligence engine 235 and/or one or more external data source (e.g., data source(s) 252). The database 248 and memory 249 allow the cloud intelligence engine 235 to store information associated with the agility agent 200, the agility agent(s) 251 and/or the data source(s) 252 over a certain period of time (e.g., days, weeks, months, years, etc.). The data source(s) 252 may be associated with a set of databases. Furthermore, the data source(s) 252 may include regulation information such as, but not limited to, GIS information, other geographical information, FCC information regarding the location of radar transmitters, FCC blacklist information, NOAA databases, DOD information regarding radar transmitters, DOD requests to avoid transmission in DFS channels for a given location, and/or other regulatory information.

The cloud intelligence engine 235 also includes processors 250 to perform the cloud intelligence operations described herein. In an aspect, the processors 250 may be communicatively coupled to the memory 249. Coupling can include various communications including, but not limited to, direct communications, indirect communications, wired communications, and/or wireless communications. In certain implementations, the processors 250 may be operable to execute or facilitate execution of one or more of computer-executable components stored in the memory 249. For example, the processors 250 may be directly involved in the execution of the computer-executable component(s), according to an aspect. Additionally or alternatively, the processors 250 may be indirectly involved in the execution of the computer executable component(s). For example, the processors 250 may direct one or more components to perform the operations.

The roaming and guest agents manager 238 in the cloud intelligence engine 235 provides optimized connection information for devices connected to agility agents that are roaming from one access point to another access point (or from one access point to another network). The roaming and guest agents manager 238 also manages guest connections to networks for agility agents connected to the cloud intelligence engine 235. The external data fusion engine 239 provides for integration and fusion of information from agility agents with information from the data source(s) 252. For example, the external data fusion engine 239 may integrate and/or fuse information such as, but not limited to, GIS information, other geographical information, FCC information regarding the location of radar transmitters, FCC blacklist information, NOAA databases, DOD information regarding radar transmitters, DOD requests to avoid transmission in DFS channels for a given location, and/or other information. The cloud intelligence engine 235 further includes an authentication interface 240 for authentication of received communications and for authenticating devices and users. The radar detection compute engine 241 aggregates radar information from the agility agent 200, the agility agent(s) 251 and/or the data source(s) 252. The radar detection compute engine 241 also computes the location of radar transmitters from those data to, among other things, facilitate identification of false positive radar detections or hidden nodes and hidden radar. The radar detection compute engine 241 may also guide or steer multiple agility agents to dynamically adapt detection parameters and/or methods to further improve detection sensitivity. The location compute and agents manager 242 determines the location of the agility agent 200 and other connected devices (e.g., agility agent(s) 251) through Wi-Fi lookup in a Wi-Fi location database, querying passing devices, scan lists from agility agents, or geometric inference.

The spectrum analysis and data fusion engine 243 and the network optimization self-organization engine 244 facilitate dynamic spectrum optimization with information from the agility agent 200, the agility agent(s) 251 and/or the data source(s) 252. Each of the agility agents (e.g., the agility agent 200 and/or the agility agent(s) 251) connected to the cloud intelligence engine 235 have scanned and analyzed the local spectrum and communicated that information to the cloud intelligence engine 235. The cloud intelligence engine 235 also knows the location of each agility agent (e.g., the agility agent 200 and/or the agility agent(s) 251) and the access points proximate to the agility agents that do not have a controlling agent as well as the channel on which each of those devices is operating. With this information, the spectrum analysis and data fusion engine 243 and the network optimization self-organization engine 244 can optimize the local spectrum by telling agility agents (e.g., the agility agent 200 and/or the agility agent(s) 251) to avoid channels subject to interference. The swarm communications manager 245 manages communications between agility agents, access points, client devices, and other devices in the network. The cloud intelligence engine includes a security manager 246. The control agents manager 247 manages all connected control agents.

Independent of a host access point 218, the agility agent 200, in the role of an autonomous DFS master device, may also provide the channel indication and channel selection control to one or more peer-to-peer client devices 231, 232 within the coverage area by (a) signaling availability of one or more DFS channels by simultaneous transmission of one or more beacon signals; (b) transmitting a listing of both the authorized available DFS channels, herein referred to as a whitelist and the prohibited DFS channels in which a potential radar signal has been detected, herein referred to as a blacklist along with control signals and a time-stamp signal, herein referred to as a dead-man switch timer via an associated non-DFS channel; and (c) receiving control, coordination and authorized and preferred channel selection guidance information from the cloud intelligence engine 235. The agility agent 200 sends the time-stamp signal, or dead-man switch timer, with communications to ensure that the devices do not use the information, including the whitelist, beyond the useful lifetime of the information. For example, a whitelist will only be valid for certain period of time. The time-stamp signal avoids using noncompliant DFS channels by ensuring that a device will not use the whitelist beyond its useful lifetime.

Such peer-to-peer devices may have a user control interface 228. The user control interface 228 includes a user interface 229 to allow the client devices 231, 232 to interact with the agility agent 200 via the cloud intelligence engine 235. For example, the user interface 229 allows the user to modify network settings via the agility agent 200 including granting and revoking network access. The user control interface 228 also includes a security element 230 to ensure that communications between the client devices 231, 232 and the agility agent 200 are secure. The client devices 231, 232 are connected to a wide area network 234 via a cellular network for example. Peer-to-peer wireless networks are used for direct communication between devices without an access point. For example, video cameras may connect directly to a computer to download video or images files using a peer-to-peer network. Also, device connections to external monitors and device connections to drones currently use peer-to-peer networks. Because there is no access point in a peer-to-peer network, traditional peer-to-peer networks cannot use the DFS channels because there is no access point to control the DFS channel selection and tell the devices what DFS channels to use. The present invention overcomes this limitation.

In addition to the aspects described above in connection with FIG. 2, the agility agent may operate as a Wi-Fi coordinator device for a network. In its capacity as a Wi-Fi coordinator device, the agility agent controls settings in an access point of a wireless network to optimize the communication between the access point and attached client devices and/or to provide additional features or services.

Figure 3:
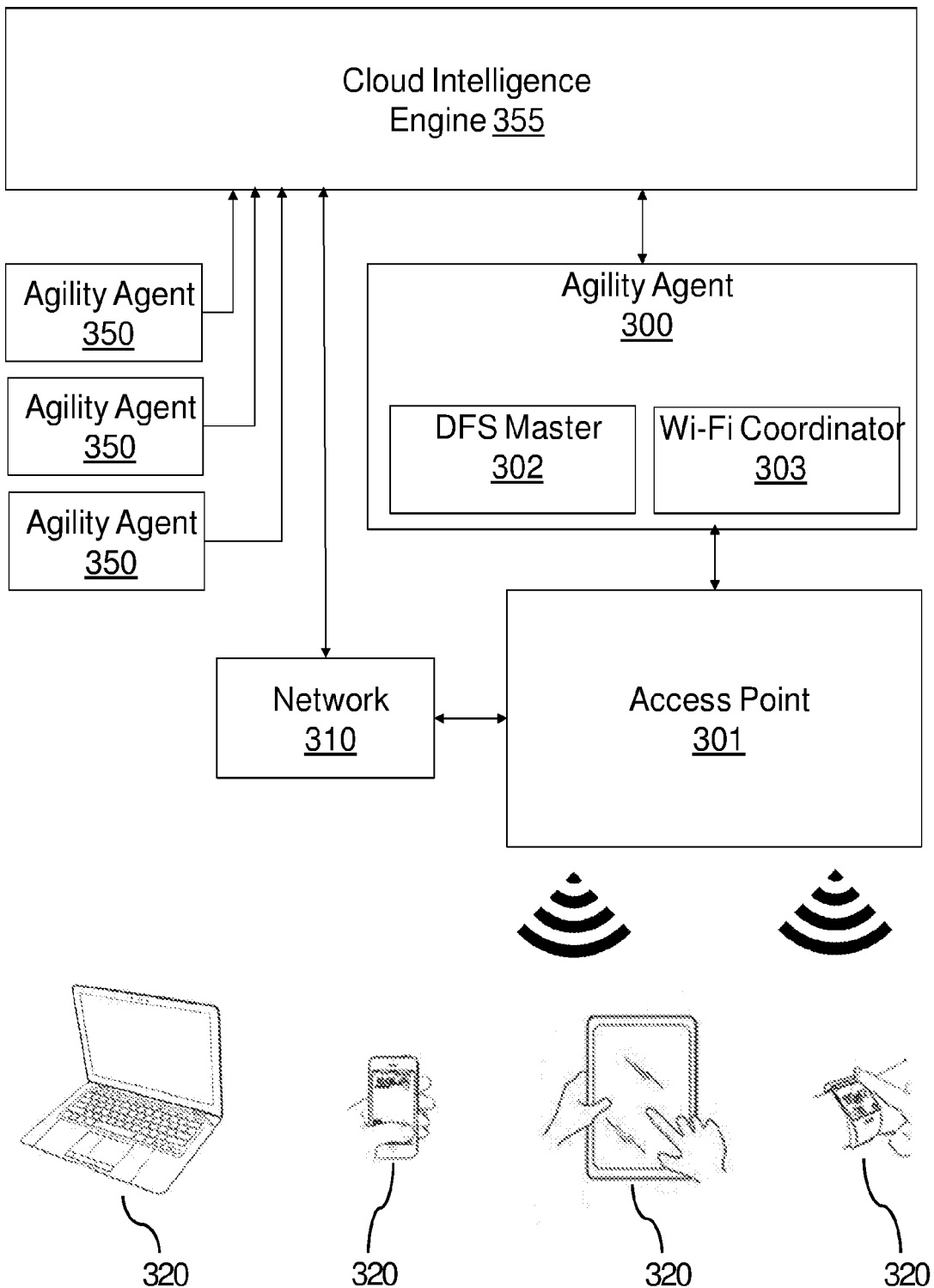
FIG. 3 illustrates an exemplary system in which an agility agent acts as a Wi-Fi coordinator device in accordance with the present invention.

FIG. 3 illustrates an exemplary system in which an agility agent 300 acts as a Wi-Fi coordinator device. As illustrated, the agility agent 300 includes both DFS master 302 and Wi-Fi coordinator 303 capability. The agility agent 300 is in communication with the access point 301. The Wi-Fi coordinator 303 in the agility agent 300 is configured to receive packet information from one or more devices within wireless range of the Wi-Fi coordinator 303.

Figure 4:
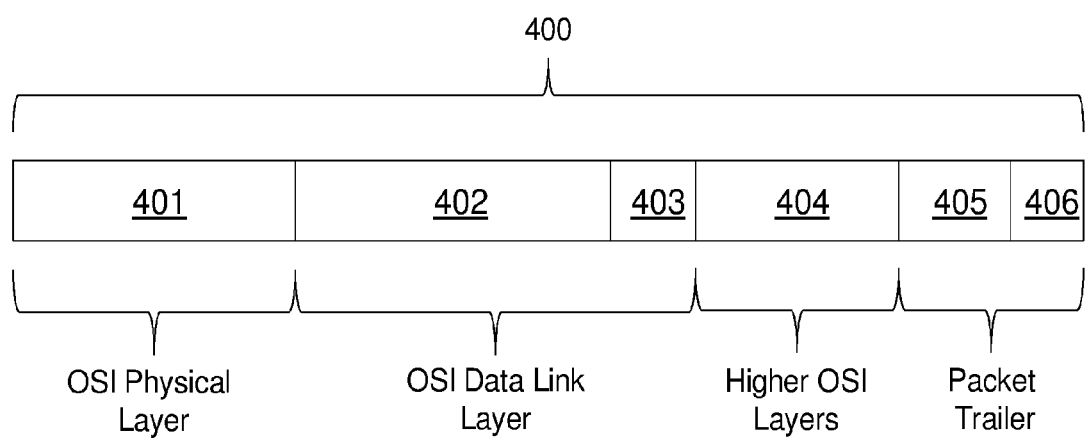
FIG. 4 illustrates the basic structure of a Wi-Fi packet.

In Wi-Fi (802.11) networks, client devices 320 transmit information to other devices (including an access point 301) via data packets. There are three basic packet types: data packets, network management packets and control packets. FIG. 4 illustrates the basic structure of a Wi-Fi packet. The first part of the packet 401 corresponds to the OSI physical layer. This portion 401 of the packet 400 contains the packet header. The second portion 402 of the packet 400 corresponds to the OSI data link layer. This portion 402, 403 includes a MAC header 402 and (optionally) a logical link control header 403. The third portion 404 of the packet 400 corresponds to higher OSI layers and includes the network data. The final portion 405, 406 of the packet 400 is the packet trailer and includes a frame check sequence 405 and an end delimiter 406.

A packet 400 is a set of data enclosed in one or more wrappers that help to identify the set of data and route it to the correct destination. The destination is a particular application or process running on a particular machine. These wrappers consist of headers, or sometimes headers and trailers. Headers are bits of data added to the beginning of a packet. Trailers are added to the end of a packet.

Packets are created at the machine sending the information. The application generating the data on the sending machine passes the data to a protocol stack running on that machine. The protocol stack breaks the data down into chunks and wraps each chunk in one or more wrappers that will allow the packets to be reassembled in the correct order at the destination. The protocol stack on the sending machine then passes the packets to the network hardware. The network hardware adds its own wrapper to each packet (the header and trailer appropriate to the particular standard) to direct it to the correct destination on the local network.

If the packet's ultimate destination is somewhere off the local network, the header added by the sending machine will point to a router or switch as its destination address. The router will open the packet, strip off the original wrapper, read enough to find the ultimate destination address, and then re-wrap the packet, giving it a new header that will send it on the next portion of its journey.

At the receiving end, the process is reversed. The packet is read by the network hardware at the receiving machine which strips off the network header and passes the packet up to the appropriate protocol stack. The protocol stack reads and strips off its headers and passes the remaining packet contents on up to the application or process to which it was addressed, reassembling the data in the correct order as it arrives.

Figure 5:
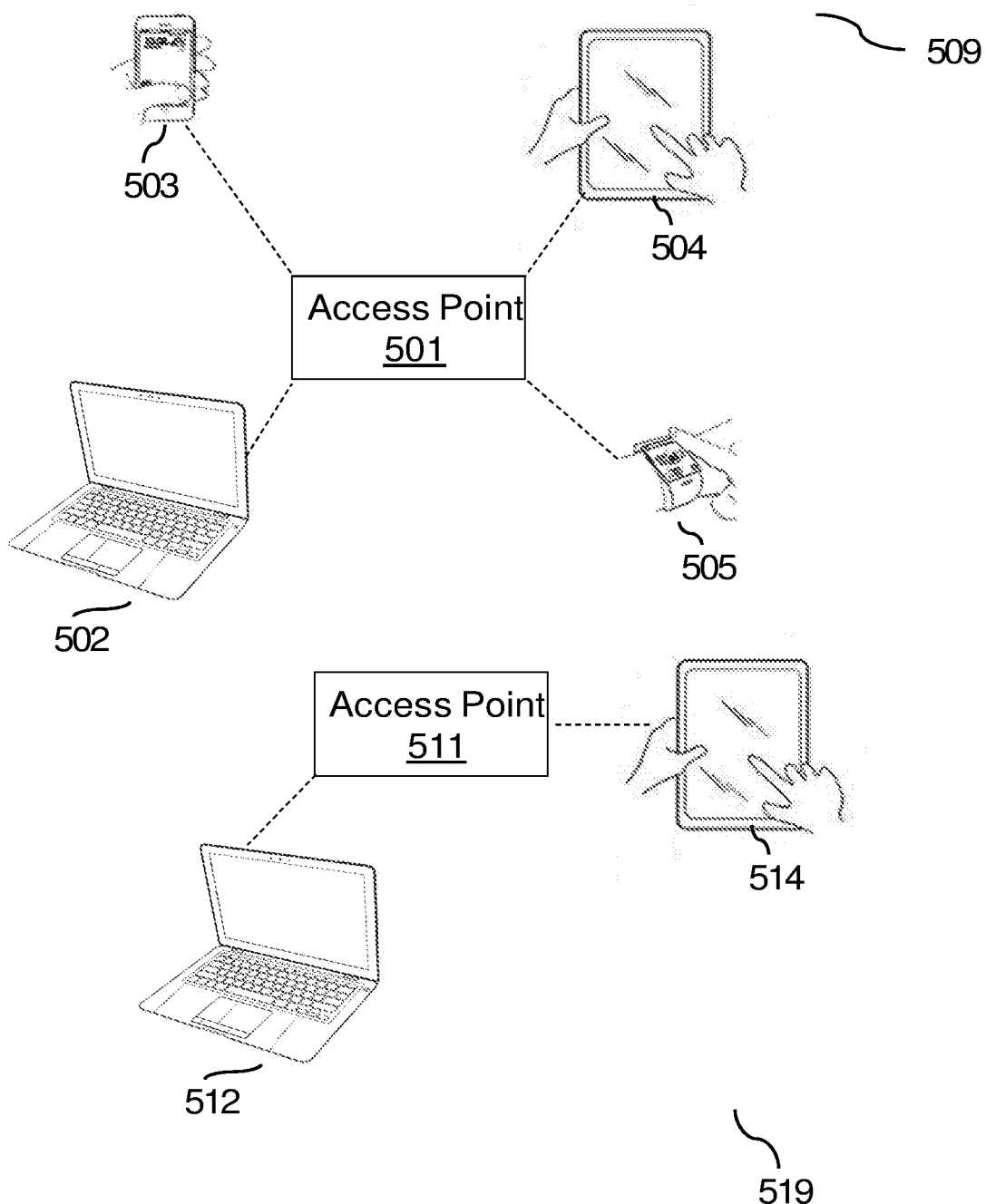
FIG. 5 illustrates the omnidirectional nature of Wi-Fi devices and access points that contributes to Wi-Fi interference and congestion.

A device 320 does not send a packet exclusively to another computer or device. The device 320 puts the address of the desired destination or receiving station in the header of the packet, and puts the packet out onto the airwaves. The omnidirectional nature of Wi-Fi devices 320 and access points 301 contributes to Wi-Fi interference and congestion. For example, as shown in FIG. 5, two access points 501, 511 each have associated client devices: 502-505 for access point 501 and 512, 514 for access point 511. These networks for each access point 501, 511 are independent, as for example, with access points of two adjacent homes or offices. As shown in FIG. 5, the Wi-Fi signals 509, 519 produced by the access points 501, 511 and their associated devices overlap. If the access points 501, 511 are using the same channel or overlapping channels and are active at the same time, they will cause interference with each other. As one of the access points tries to talk to its clients, its transmissions become garbled because of the transmissions of the other access point and associated devices. This drives down the performance of both of the networks.

Figure 6:
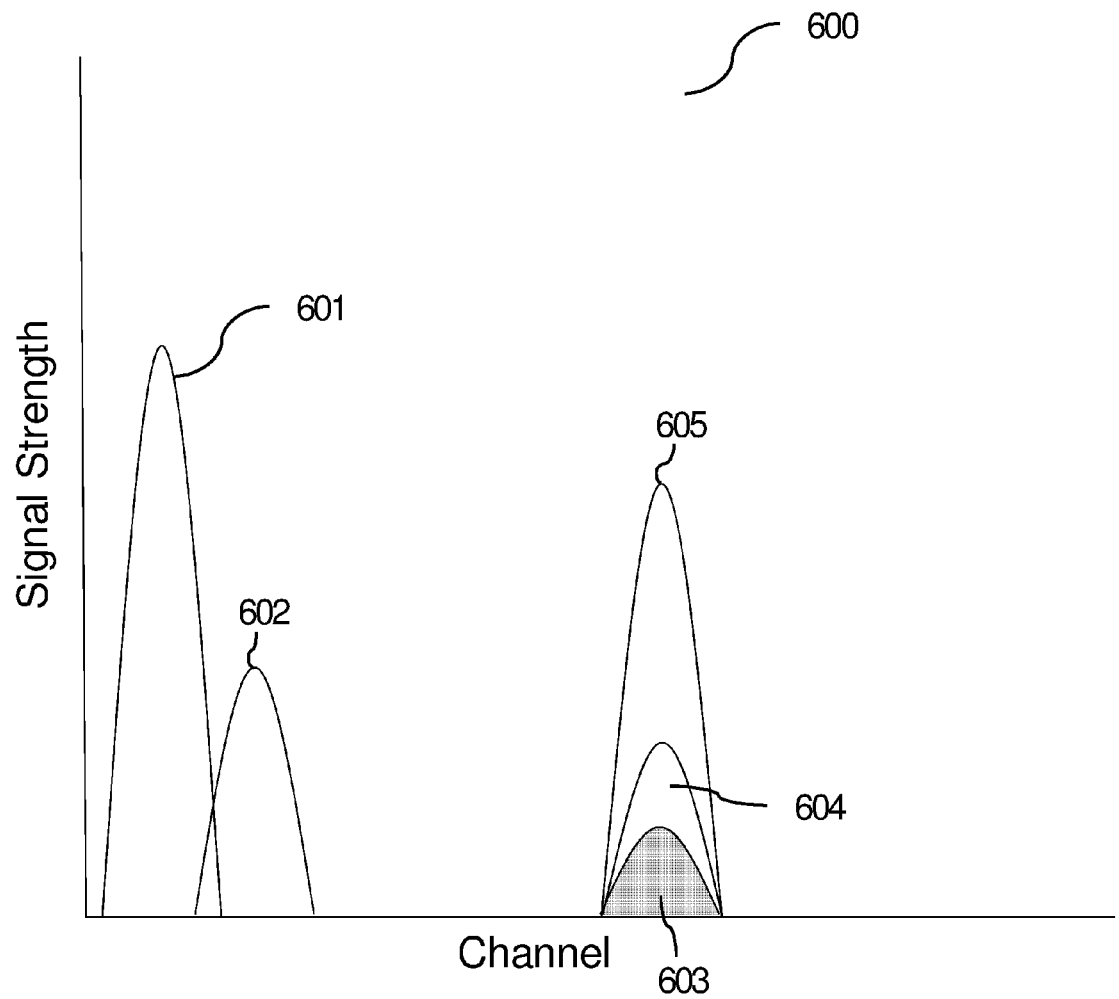
FIG. 6 illustrates the problem of interference and congestion in Wi-Fi networks.

FIG. 6 further illustrates the problem of interference and congestion in Wi-Fi networks. FIG. 6 shows an exemplary Wi-Fi spectrum map 600 showing signal strength plotted against Wi-Fi channel. The signals 601 and 602 correspond to access points with overlapping channels. And the signals 603-605 correspond to access points operating on the same channel.

In addition to the problems described above, having several devices using the same channel within the wireless range of an access point operating on that channel can cause congestion at the access point. Congestion may occur when the input traffic rate at the access point exceeds the capacity of the access point to process incoming packets. If a stream of packets arrive nearly simultaneously, a queue will build up. If there is insufficient memory to hold all the packets, the packet will be lost. And merely increasing the memory to unlimited size may not solve the problem. This is because, by the time packets reach front of the queue, they have already timed out (as they waited the queue). When timer goes off source transmits duplicate packet that are also added to the queue. Thus same packets are added again and again, increasing the load.

Figure 7:
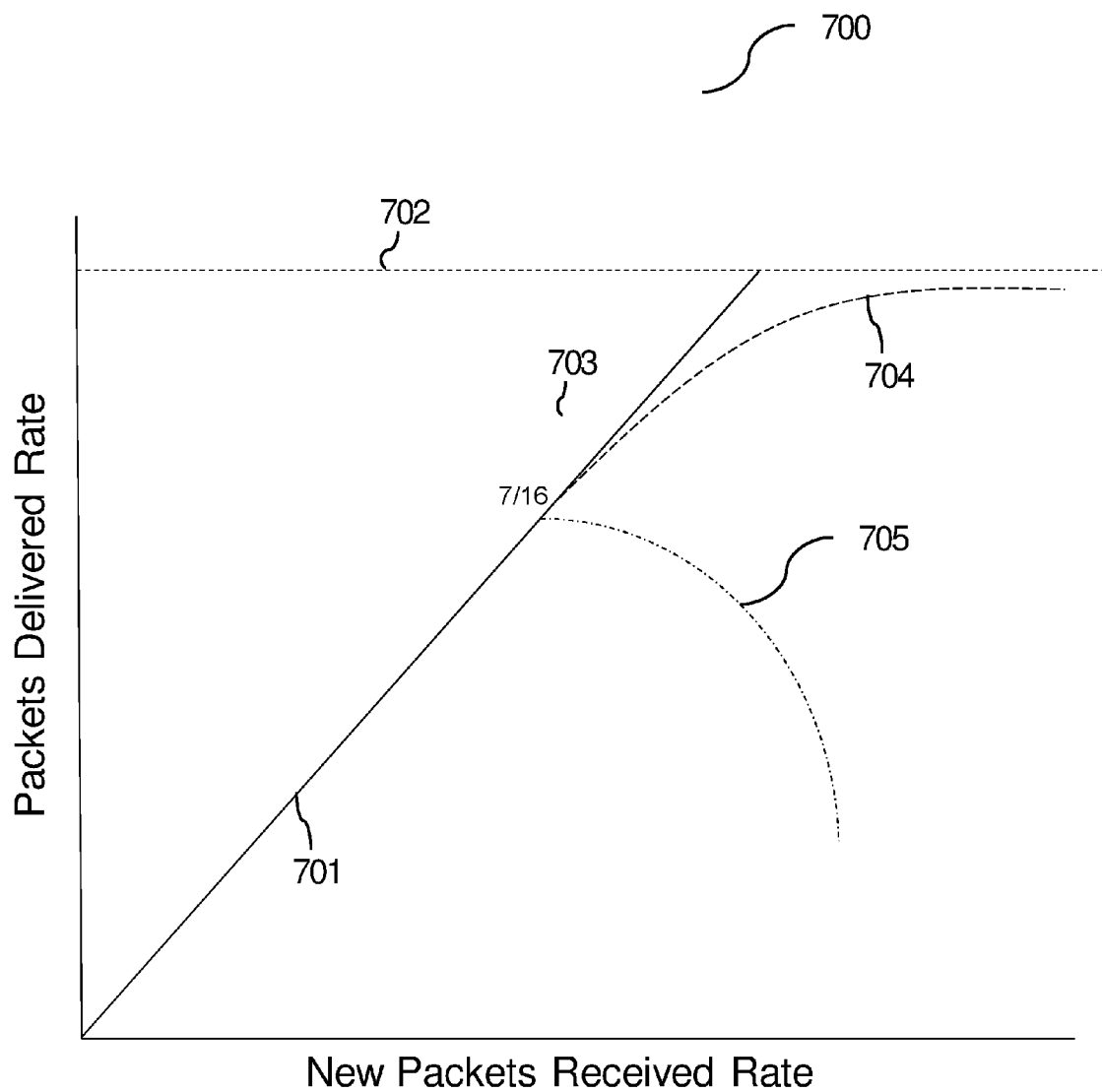
FIG. 7 illustrates the effects of congestion on packet delivery.

FIG. 7 shows a plot 700 the effects of congestion on packet delivery. In FIG. 7, the rate of packet delivery by an access point is plotted against the rate of receipt of new packets at the access point. Line 701 shows the initial relationship between new packet receipt and packet delivery rate and the theoretical extrapolation of that rate up to the maximum capacity of the access point 702. The shaded region 703 is region in which the access point begins to become congested and loose packets. It would be desirable for the access point to be able to keep up with the incoming packets and follow a response as shown by line 704 in which the rate of packet delivery continues to increase as the rate of new packet receipt increases until the maximum capacity of the access point 702 is reached. In reality, around the congestion region 703, the rate of packet delivery begins to decrease as the rate of new packet receipt increases due to packet drops and re-sent packets.

The present invention uses the same omnidirectional behavior of Wi-Fi that contributes to the interference and congestion problems to help ameliorate those issues. Indeed, because a device 320 does not send a packet exclusively to the intended recipient, the Wi-Fi coordinator 303 can monitor packet information from all Wi-Fi devices within rage of the Wi-Fi coordinator 303, including devices associated with other access points. Each Wi-Fi device within range is able to listen to the transmission and use the first address in the header to determine if that device should process it. If the packet was intended for a particular device, that machine captures it, puts it in memory, and then passes it to the next layer of the protocol stack for processing. If the message was received intact, the receiving node typically sends an ACK to acknowledge this. For example, if a client device 320 transmits a packet addressed to a device connected to access point 301, other access points within range receive a packet that contains intended recipient's address, but will ignore the packet when they find it has an address that is not their own in the first address field of the packet's header. Generally, only the intended device (e.g., access point 301), after finding its own address in that first field, processes the packet further.

Because the device 320 does not send a packet exclusively to the intended recipient, the Wi-Fi coordinator 303 can monitor packet information from all Wi-Fi devices within rage of the Wi-Fi coordinator 303, including devices associated with other access points. The Wi-Fi coordinator 303 transmits the packet information to the cloud intelligence engine 355. The cloud intelligence engine 355 time shifts, aggregates, inspects, post processes, and analyzes the packet information. The cloud intelligence engine 355 time shifts the packet information by capturing and storing (with full timing information) the packet information. The packet timing information is preserved and may be used by the cloud intelligence engine 355 in analyzing conversations and building signatures (periodicity and delays between packets). Post processing includes slicing up the packet into individual protocol/framing layers and extracting or parsing information at each layer for the next stage. To minimize storage requirements, the post processing may extract only the salient information and discard the rest of the packet (for example the payload may be encrypted and not of much use). Then the analysis stage goes through looking at the headers (e.g., src/dst fields), control bytes, flags, sequence numbers and analyzing the "conversation" between two endpoints. If for example two endpoints are struggling to communicate that would show up the packet analysis with retry flags and sequence numbers being lost.

The Wi-Fi coordinator 303 listens on a channel and collects all of the packet information available that channel. Some packets are encrypted and others are not encrypted. And certain portions of even encrypted packets are not encrypted. For example, packet envelopes, packet headers, sequence counters, packet type, packet size, retry bits, collision bits, flags, status, timestamp, data rate, channel, signal level, noise level, MAC header, Logical Link Control header, and IP, TCP, and/or HTTP data may not be encrypted. All of the packet information together is used by the cloud intelligence engine 355 to determine a signature for a device and/or area. For example, based on the MAC address the system can extract the OUI (organizationally unique) device to narrow it to a particular company. The system can look at the pattern and behavior of going into power save (mobile device behavior) as well as its use of other control signaling techniques such as RTS/CTS and CTS-to-self. Analyzing management frames during the association of a client can reveal operating parameter exchanges (capabilities, security modes, power and qos settings) that can identify the type of device. The signature can tell you about the type of devices (e.g., iPhone, android), the type of information sent (e.g., video packet, email packet), and the number of times the packet was sent (e.g., is this first time sent or 5th time the packet was sent).

In one example, the Wi-Fi coordinator 303 receives and transmits the label of every packet it receives to the cloud intelligence engine 355. The cloud intelligence engine 355 records the label of every packet, collects them, and post process in the cloud. The cloud intelligence engine 355 determines signatures from the packet information and determines the number of collisions experienced and/or whether large amounts of video packets are being transmitted. Based on this, the cloud intelligence engine 355 directs the Wi-Fi coordinator 303 to change the settings of the access point 301 to improve Wi-Fi performance. Thereafter, the Wi-Fi coordinator continues to transmit packet information to the cloud intelligence engine 355, and the cloud intelligence engine 355 determines if the change in the access point 301 settings improved performance and/or altered the packet information received. Additionally, the cloud intelligence engine 355 may determine if videos sent are not reaching a bit rate required and can cause the Wi-Fi coordinator 303 to have the access point 301 move to a cleaner channel. In another example, the cloud intelligence engine 355 looks at other packets with time stamps and determines a time between retries and evaluates network operation.

In another example, the cloud intelligence engine 355 can determine a pattern of packets to get signature of person or group. For example, if a family's children always come home from school and start using the internet at certain time, the cloud intelligence engine 355 will determine and learn this behavior. If the behavior changes (e.g., the children do not start using the internet at the normal time of day), an alarm or notification can be sent to the parents based on the packet analysis. Alternatively, if an unusual amount of packet traffic is detected in a home at a time at which there is usually little to no traffic at the home, the cloud intelligence engine may send an alarm or notification.

The Wi-Fi coordinator may be configured to capture information from other networks. In this instance, the Wi-Fi coordinator not only receives packet information from the access point 301, or attached clients themselves, but it can also receive packets from devices in neighboring networks over the air passively. This is advantageous because being able to sense these devices can provide more information to the cloud intelligence engine.

As shown in FIG. 3, the cloud intelligence engine 355 is communicatively coupled to the agility agent 300. The cloud intelligence engine 355 is configured to receive the packet information from the agility agent 300 and to integrate the packet information with other packet information. The packet information can include information such as packet envelopes, packet headers, packet type, packet size, retry bits, collision bits, flags, status, timestamp, data rate, channel, signal level, noise level, MAC header, Logical Link Control header, and IP, TCP, and/or HTTP data. The other packet information the cloud intelligence engine 355 uses is information that the cloud intelligence engine 355 has received from the agility agent 300 or other sources. After the cloud intelligence engine 355 generates the integrated packet information, it determines one or more Wi-Fi setting for the access point 301 to use (operational Wi-Fi settings) based (at least in part) on the integrated packet information.

The cloud intelligence engine 355 may transmit the operational Wi-Fi settings to the agility agent 300, and the Wi-Fi coordinator 303 in the agility agent 300 causes the access point 301 to implement the one or more operational Wi-Fi settings. The agility agent 300 may use the access point control agent 219, 224 shown in FIG. 2 to cause the access point 301 to implement the operational Wi-Fi settings.

As previously described, the cloud intelligence engine 355 contains databases and may obtain data from external sources. In one embodiment, the cloud intelligence engine 355 determines the operational Wi-Fi settings based on Wi-Fi standards information stored in one or more databases. Further, the cloud intelligence engine 355 may determine the operational Wi-Fi settings based on regulatory information associated with the client devices 320.

In addition to retrieving information about the client devices 320 from internal and external databases, the cloud intelligence engine 355 may compile empirical information about the client devices 320 through observation and experimentation. As shown in FIG. 3, the cloud intelligence engine 355 is connected to multiple agility agents 300, 350. These agility agents 300, 350 may be dispersed throughout the world and may gather information about the client devices connected to the access points connected the respective agility agents 300, 350. In one embodiment, the cloud intelligence engine 355 and the Wi-Fi coordinator 303 in the agility agent 300 are configured to cause the access point 301 to adjust one or more temporary Wi-Fi settings. The settings are temporary, because the cloud intelligence engine 355 has not yet determined the optimized operational settings at which to optimize the access point 301 communication with the client devices 320. As it varies the temporary Wi-Fi settings in the access point 301, the cloud intelligence engine 355 and the Wi-Fi coordinator 303 in the agility agent 300 receive Wi-Fi performance parameters and determine how the Wi-Fi performance parameters change as a function of the variations in the temporary Wi-Fi settings. Based on the variation in the Wi-Fi performance parameters, the cloud intelligence engine 355 determines the operational Wi-Fi settings for the access point 301. Additionally, the cloud intelligence engine 355 may isolate one of the client devices 320 and vary the temporary Wi-Fi settings and monitor the performance parameters for the one client device 320. This way, the cloud intelligence engine 355 can build and update a database of client device capabilities and optimal settings.

The cloud intelligence engine 355 includes a database for storing the variation in the Wi-Fi performance parameters relative to the adjustment in the temporary Wi-Fi settings. And the cloud intelligence engine 355 may use the stored information to determine optimized operational Wi-Fi settings for a second access point (e.g., another access point connected to the agility agent 300 or to one of the other agility agents 350) based on the variation in the one or more Wi-Fi performance parameters.

The Wi-Fi performance parameters include information such as Wi-Fi throughput, range, signal strength, error rate, collision rate, and output power. The operational Wi-Fi settings include channel, beacon interval, beamforming settings, Wi-Fi multimedia power save (WMMPS) compatibility, frame burst, delivery traffic indication message (DTIM) interval, fragmentation threshold, request to send (RTS) threshold, transmit (TX) antenna, receive (RX) antenna, preamble length, transmit (TX) power, Afterburner/Super G/Speedbooster, Bluetooth coexistence mode, wireless network mode, and sensitivity range (acknowledge (ACK) timing). The above lists are only examples of the access point parameters that may be optimized with the present invention. For example, access point parameters that can be optimized with the present invention may include chipset-specific parameters.

In addition to the performance and operational parameters discussed above, the cloud intelligence engine 355 of the present invention may optimize settings in an access point based on packet information in order to improve safety and/or reliability of the network. For example, the cloud intelligence engine 355 may configure access point isolation, firewall settings for guest network access to insure network isolation, and/or wireless GUI access (access to the wireless graphical user interface of the access point using a client device. The cloud intelligence engine 355 may also perform security configuration and periodic auditing of the access point. Further the cloud intelligence engine 355 of the present invention may modify parameters in client devices to optimize network performance based on the integrated packet information.

Figure 8:
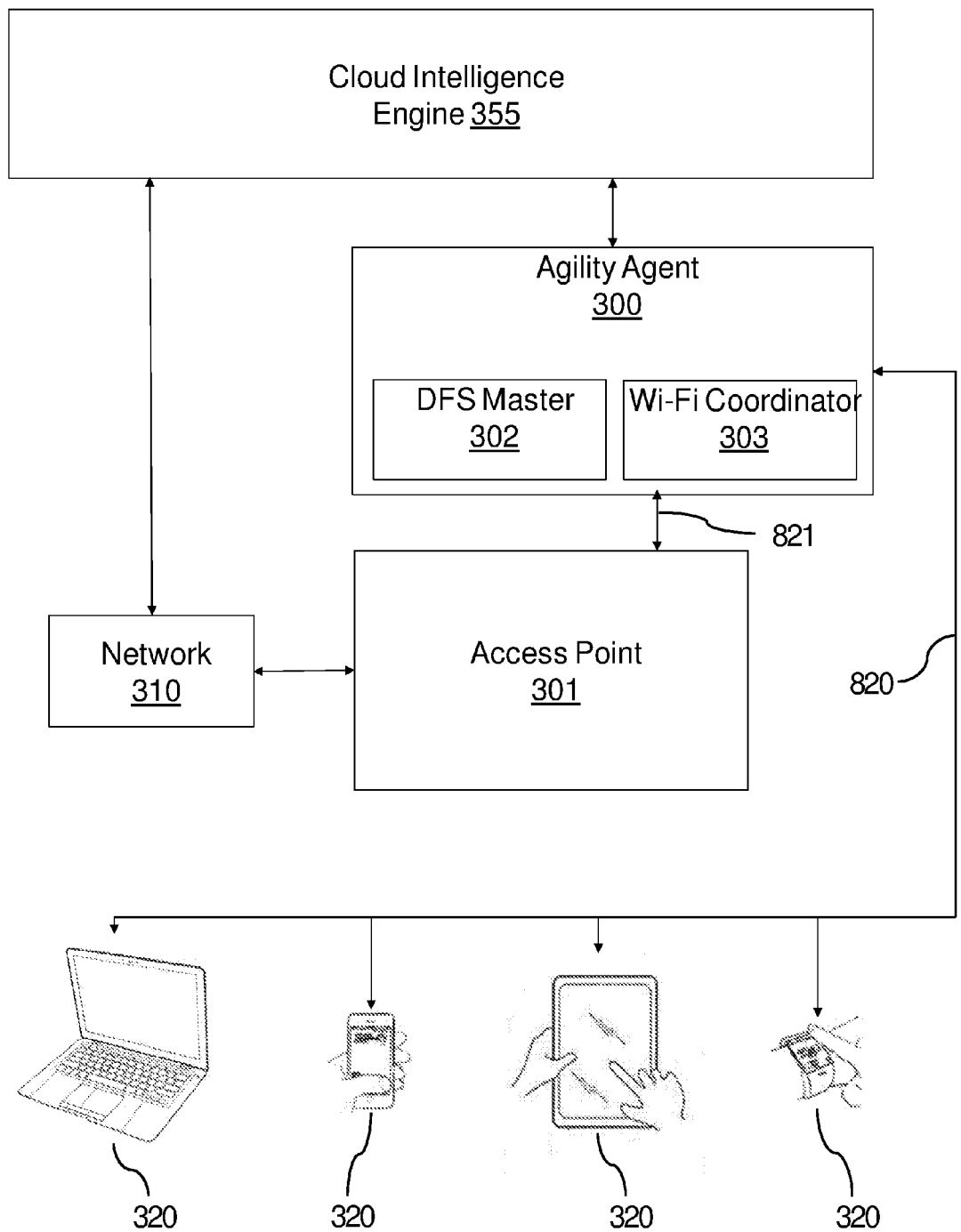
FIG. 8 illustrates an exemplary flow of information in a system of the present invention.
Figure 9:
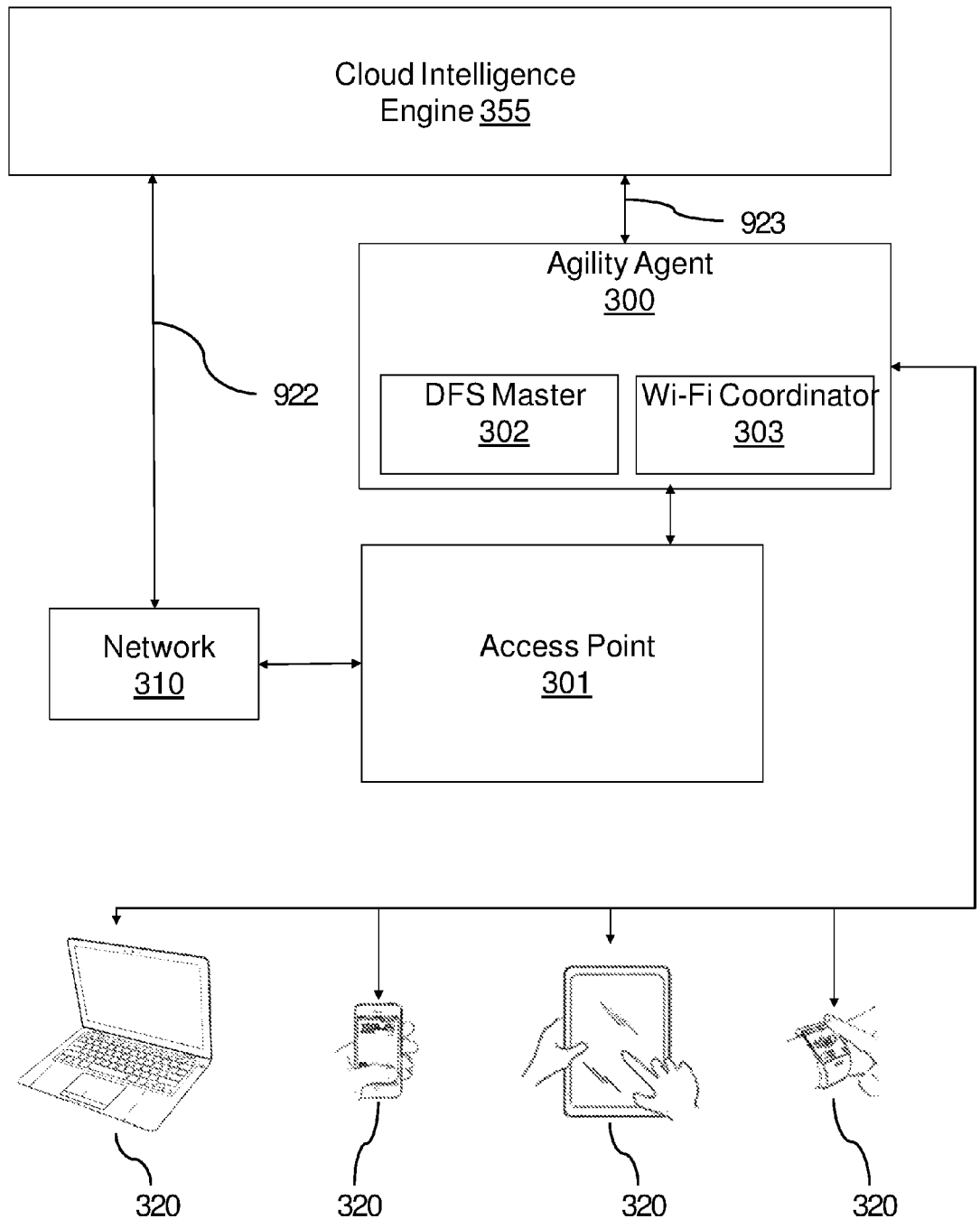
FIG. 9 illustrates an exemplary flow of information in a system of the present invention.

FIGS. 8 and 9 illustrate an exemplary flow of information in a system of the present invention. As shown in FIG. 8, in one embodiment, the Wi-Fi coordinator 303 receives the packet information directly 820 from the client devices 320 and other Wi-Fi devices within wireless range of the Wi-Fi coordinator. The Wi-Fi coordinator 303 may receive the packet information directly 820 from the client devices 320 via a radio receiver in the agility agent 300 that scans for the packet information. In another embodiment, the Wi-Fi coordinator 303 receives the packet information from the access point 301 via a communication path 821. Additionally, the Wi-Fi coordinator 303 may also capture packet information from other networks (not shown). The Wi-Fi coordinator 303 not only receives packet from the access point 301, or attached clients 320, but it can also detect packets from neighboring networks (not shown). This way, the Wi-Fi coordinator 303 can provide more packet information to the cloud intelligence engine 355.

FIG. 9 illustrates the transmission of information from the Wi-Fi coordinator 303 to the cloud intelligence engine 355. As shown, the Wi-Fi coordinator 303 may transmit the packet information to the cloud intelligence engine 355 over a communication path 922 via a wide area network 310. Alternatively, the Wi-Fi coordinator 303 may transmit the packet information to the cloud intelligence engine 355 over a communication path 923 through a network connection of a client device 320 acting as a proxy. Additionally, the Wi-Fi coordinator 303 may send information about the access point 301 to the cloud intelligence engine 355. The cloud intelligence engine 355 may use this information to determine the optimized operational Wi-Fi settings for the access point 301.

Figure 10:
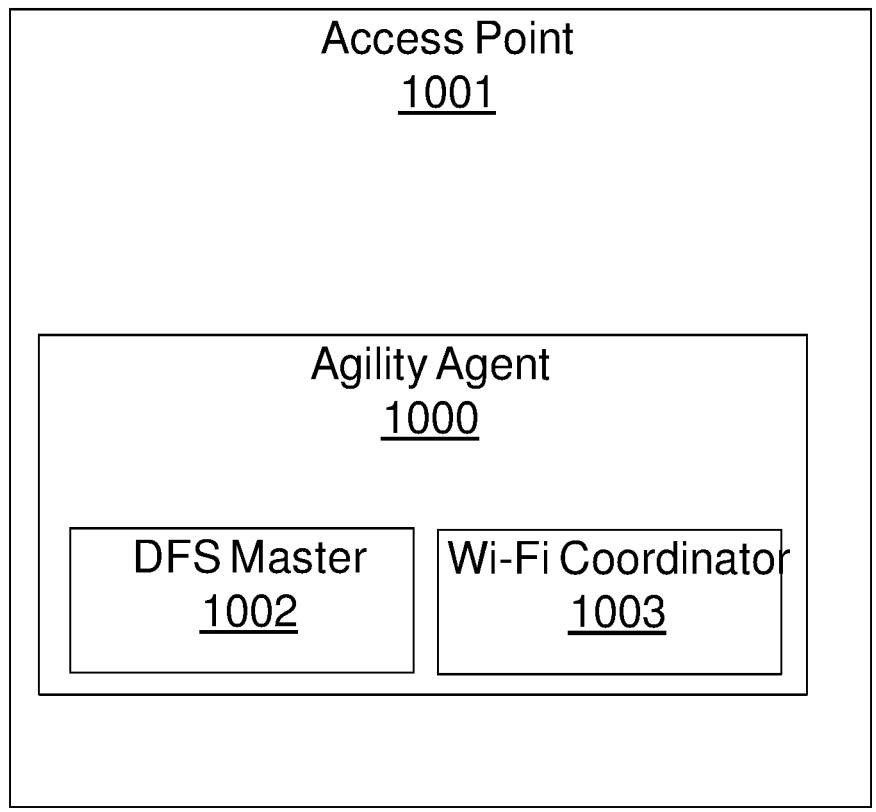
FIG. 10 illustrates an embodiment of the agility agent of the present invention relative to a network access point.
Figure 11:
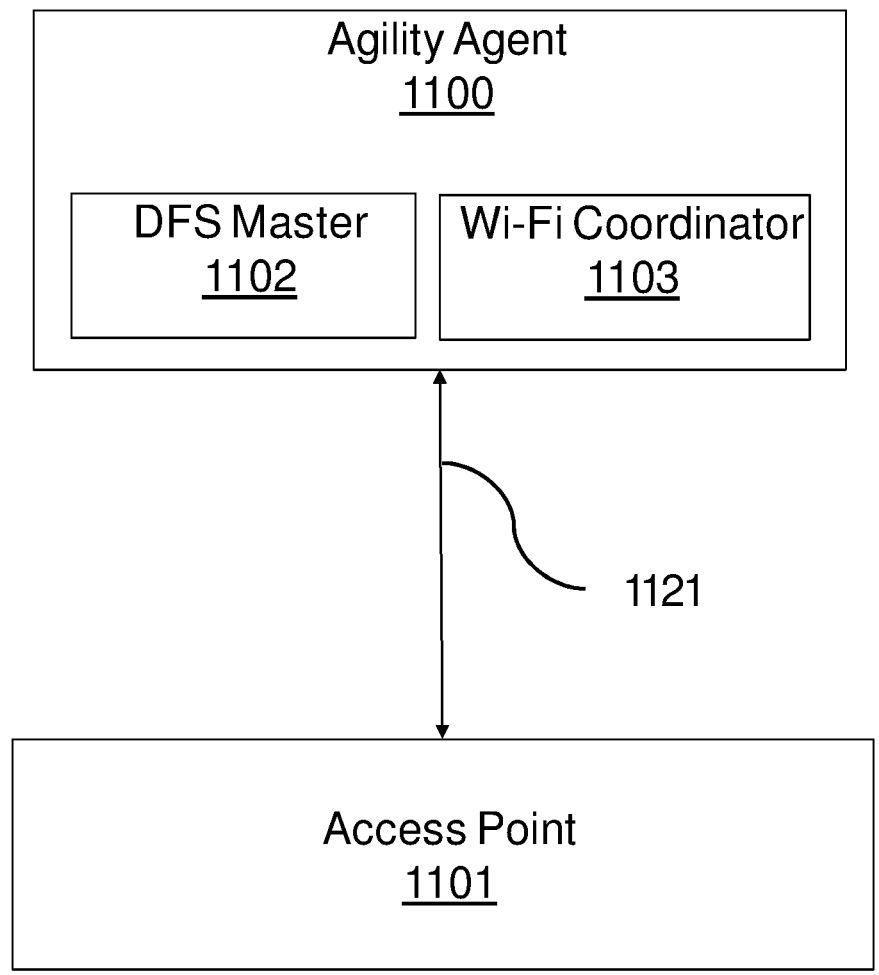
FIG. 11 illustrates an embodiment of the agility agent of the present invention relative to a network access point.

FIGS. 10 and 11 illustrate embodiments of the agility agent of the present invention relative to a network access point. As illustrated in FIG. 10, the agility agent 1000 (including the Wi-Fi coordinator 1003 and the DFS master 1002) may be physically or operationally integrated with the access point 1001. In one example, the agility agent 1000 and/or Wi-Fi coordinator 1003 utilize processing resources in the access point 601. Alternatively, as shown in FIG. 11, the agility agent 1100 (including the Wi-Fi coordinator 1103 and the DFS master 1102) may be a standalone device separate from but communicatively coupled 1121 to the access point 701. In the standalone example, the agility agent 1100 and/or Wi-Fi coordinator 1103 do not utilize processing resources in the access point 1101.

Figure 12:
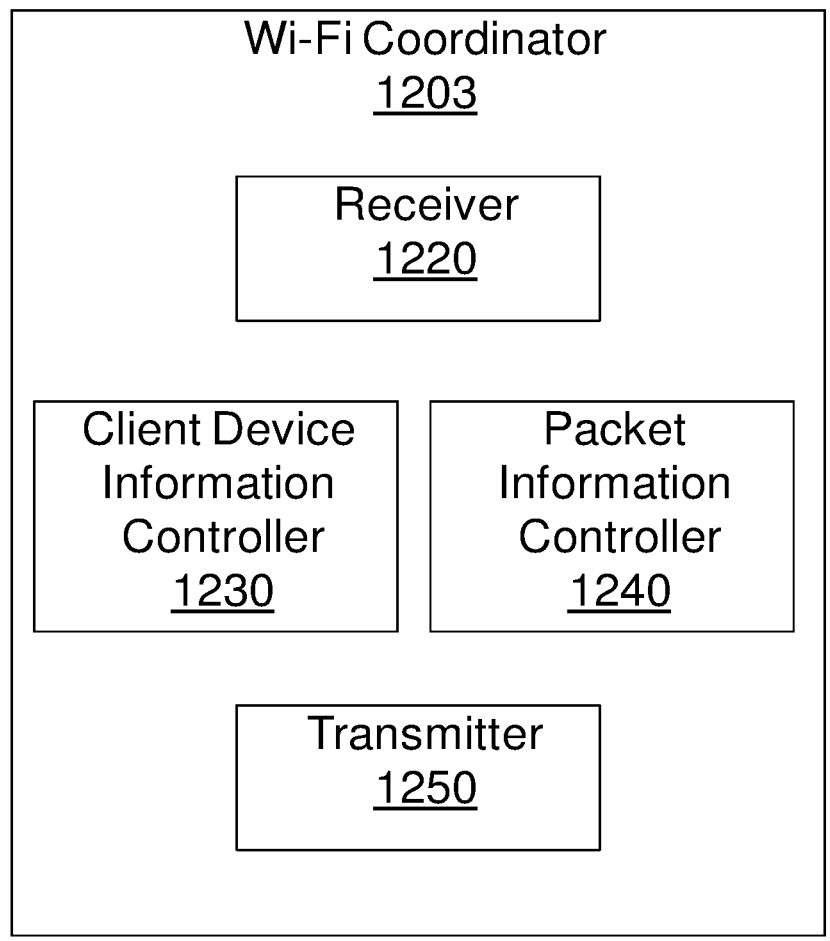
FIG. 12 illustrates the components of an embodiment of the Wi-Fi coordinator.

FIG. 12 illustrates the components of an embodiment of the Wi-Fi coordinator 1203. The Wi-Fi coordinator 1203 includes a receiver 1220 for receiving client device information and/or packet information as previously described. The Wi-Fi coordinator 1203 also includes a client device information controller 1230 for processing received client device information before transmitting it to the cloud intelligence engine. Alternatively, the Wi-Fi coordinator 1203 may simply pass through the client device information to the cloud intelligence engine. Similarly, the Wi-Fi coordinator 1203 also includes a packet information controller 1230 for processing received packet information before transmitting it to the cloud intelligence engine. The Wi-Fi coordinator 1203 may perform pre-processing under the direction of the cloud intelligence engine to remove information that is not of use as well as compress the information. In cases where the payload is encrypted, the Wi-Fi coordinator 1203 may only extract the unencrypted portion of the frame, compress it and send only that portion to the cloud intelligence engine. The Wi-Fi coordinator 1203 could also do a first level filtering based on a set of filter parameters from the cloud intelligence engine (e.g., packet type, src/dest address, filtering). Alternatively, the Wi-Fi coordinator 1203 may simply pass through the packet information to the cloud intelligence engine. The Wi-Fi coordinator 1203 also includes a transmitter 1250 for transmitting information to the cloud intelligence engine and for transmitting instructions from the cloud intelligence engine to a connected access point.

In view of the subject matter described supra, methods that can be implemented in accordance with the subject disclosure will be better appreciated with reference to the flowcharts of FIGS. 13-16. While for purposes of simplicity of explanation, the methods are shown and described as a series of blocks, it is to be understood and appreciated that such illustrations or corresponding descriptions are not limited by the order of the blocks, as some blocks may occur in different orders and/or concurrently with other blocks from what is depicted and described herein. Any non-sequential, or branched, flow illustrated via a flowchart should be understood to indicate that various other branches, flow paths, and orders of the blocks, can be implemented which achieve the same or a similar result. Moreover, not all illustrated blocks may be required to implement the methods described hereinafter.

Figure 13:
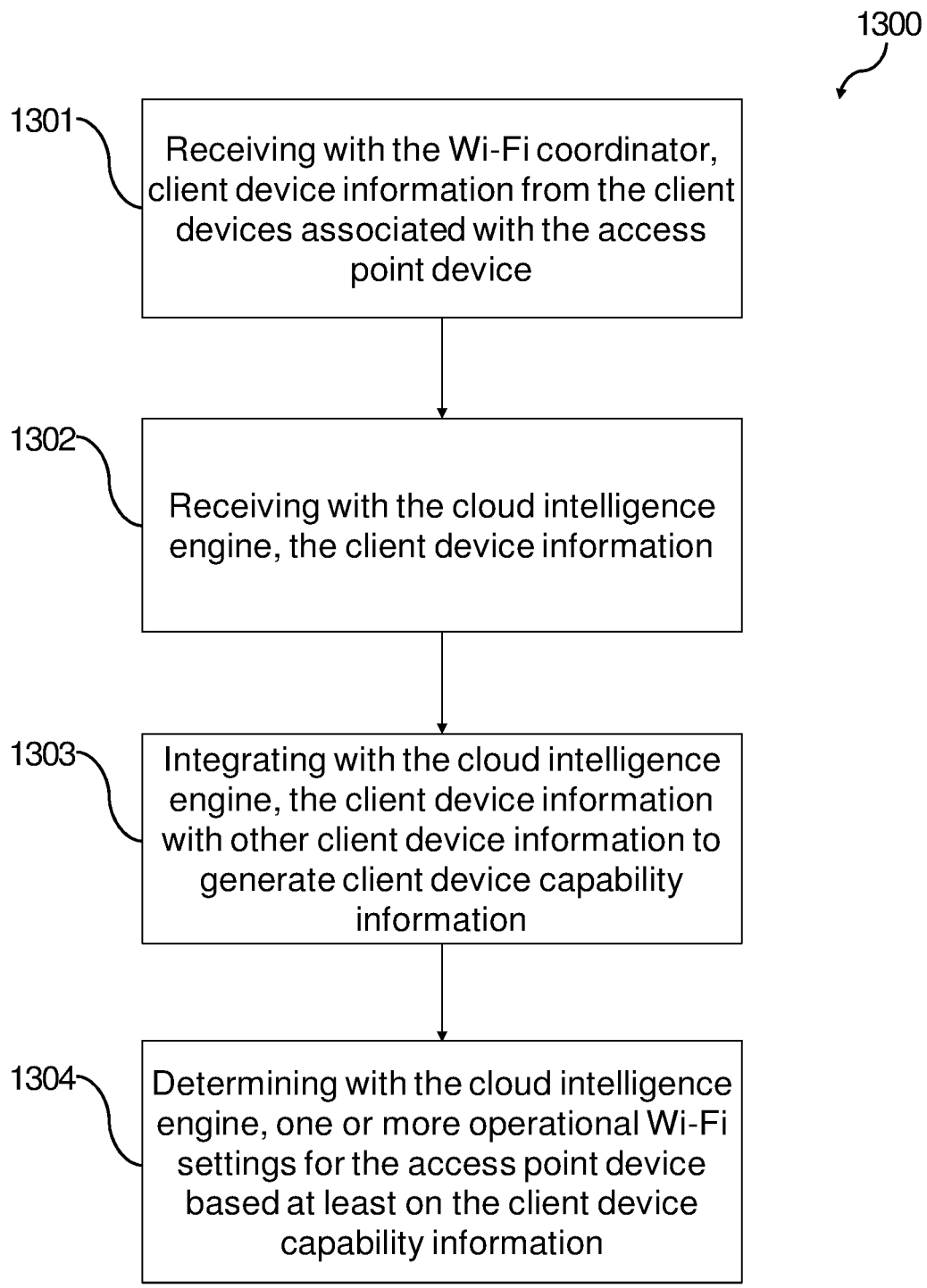
FIG. 13 illustrates an exemplary method according to the present invention for selecting and implementing communication parameters to optimize the interaction between access points and client devices.

FIG. 13 illustrates an exemplary method 1300 according to the present invention for selecting and implementing communication parameters to optimize the interaction between access points and client devices. Initially, at 1301, a Wi-Fi coordinator receives packet information from one or more devices within wireless range of the Wi-Fi coordinator. The access point is in communication with the Wi-Fi coordinator. Next, at 1302, the cloud intelligence engine receives the packet information from the Wi-Fi coordinator and time shifts the packet information. At 1303, the cloud intelligence engine then combines, or integrates, the packet information with other packet information—which the cloud intelligence engine has stored or retrieves from other sources—to generate integrated packet information. Next, at 804, using this integrate packet information, the cloud intelligence device determines the access point settings that would optimize the operation of the network.

Figure 14:
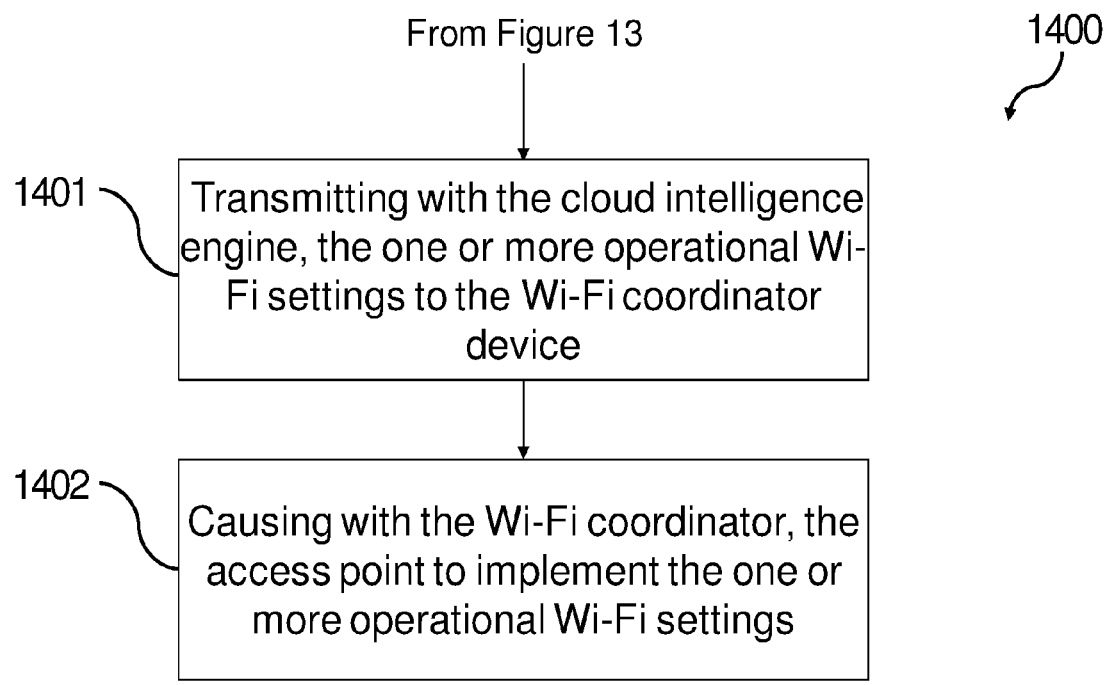
FIG. 14 illustrates an exemplary method according to the present invention for selecting and implementing communication parameters to optimize the interaction between access points and client devices.

FIG. 14 illustrates additional steps 1400 in an exemplary method according to the present invention for selecting and implementing communication parameters to optimize the interaction between access points and client devices. After the steps illustrated in FIG. 13, at 1401 the cloud intelligence engine transmits the one or more operational Wi-Fi settings to the Wi-Fi coordinator device. And at 1402 the Wi-Fi coordinator causes the access point to implement the one or more operational Wi-Fi settings.

Figure 15:
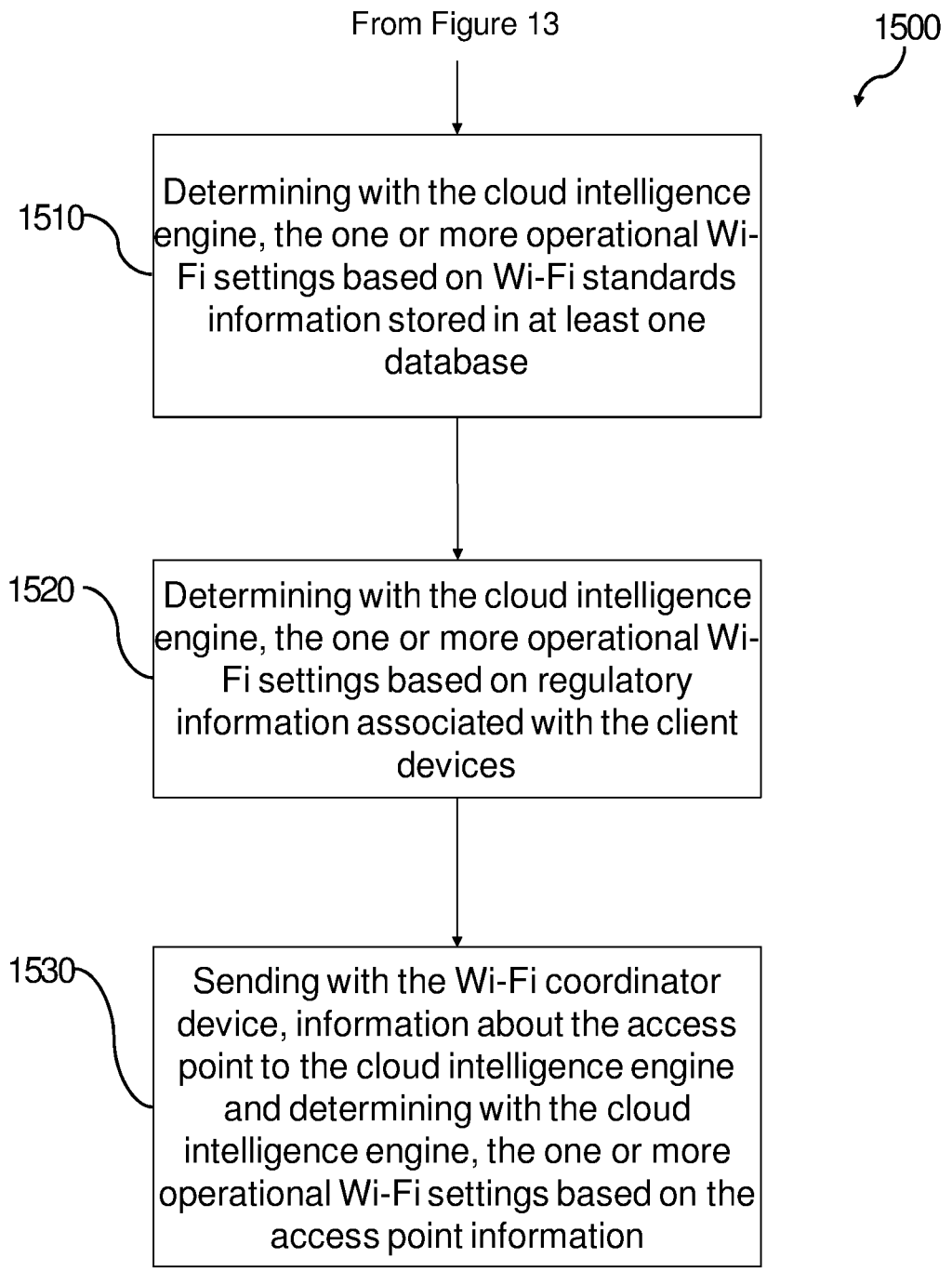
FIG. 15 illustrates an exemplary method according to the present invention for selecting and implementing communication parameters to optimize the interaction between access points and client devices.

FIG. 15 illustrates an exemplary method 1500 according to the present invention for determining an operating channel for an access point device via an agility agent device and a cloud intelligence engine device. The method illustrated in FIG. 15 includes the steps described in relation to FIG. 13 above but also includes the following optional additional steps. At 1510, the method includes using the cloud intelligence engine to determine the one or more operational Wi-Fi settings based on Wi-Fi standards information stored in at least one database. And at 1520, the method includes using the cloud intelligence engine to determine the one or more operational Wi-Fi settings based on regulatory information associated with the client devices. Further, as shown at 1530, the method may also include using the Wi-Fi coordinator device to send information about the access point to the cloud intelligence engine and using the cloud intelligence engine to determine the one or more operational Wi-Fi settings based on the access point information.

Figure 16:
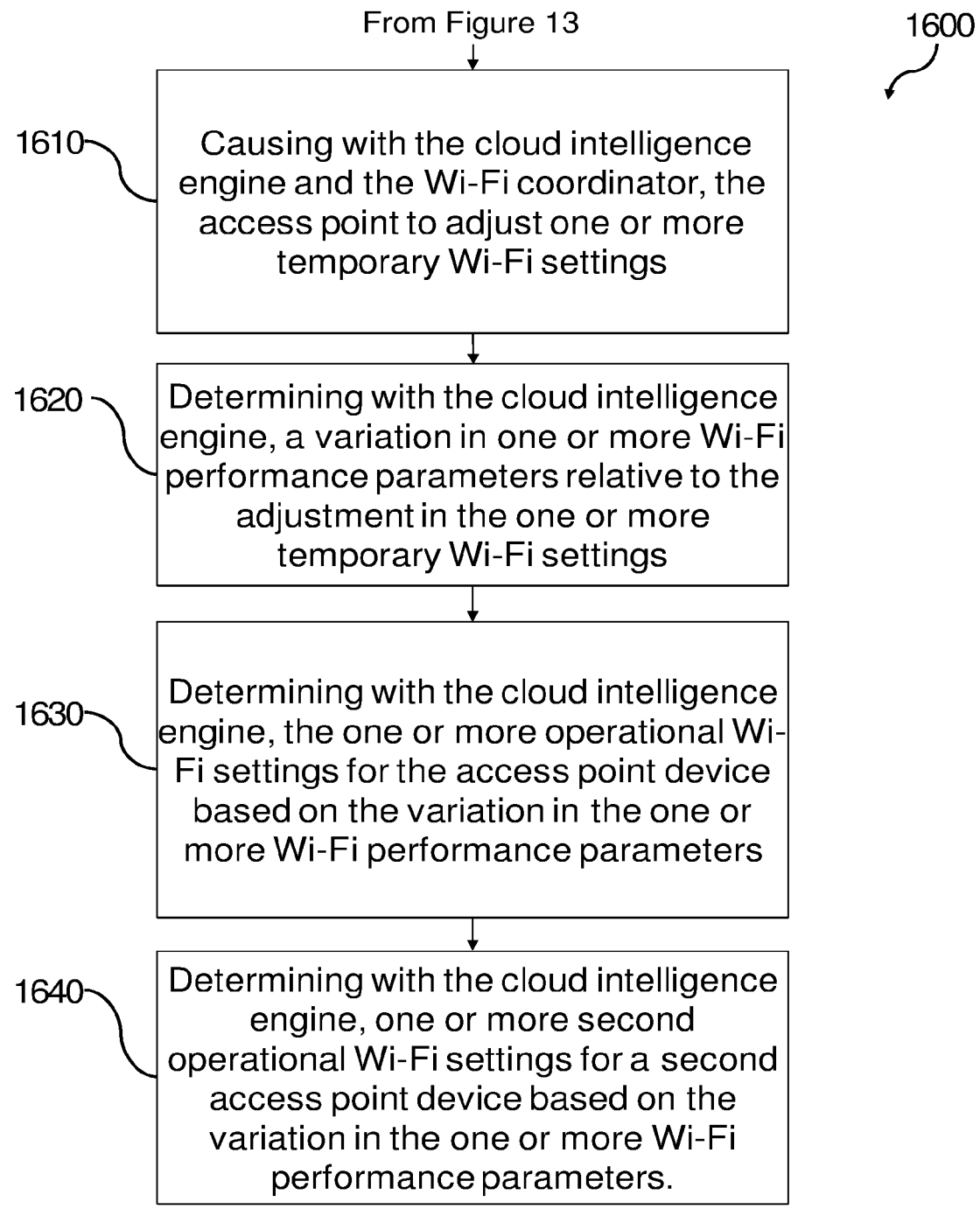
FIG. 16 illustrates an exemplary method according to the present invention for selecting and implementing communication parameters to optimize the interaction between access points and client devices.

FIG. 16 illustrates additional steps 1600 in an exemplary method according to the present invention for selecting and implementing communication parameters to optimize the interaction between access points and client devices. After the steps illustrated in FIG. 13, at 1610 the cloud intelligence engine and the Wi-Fi coordinator cause the access point to adjust one or more temporary Wi-Fi settings. Then at 1620, the cloud intelligence engine determines a variation in one or more Wi-Fi performance parameters relative to the adjustment in the one or more temporary Wi-Fi settings. And at 1630, the cloud intelligence engine determines the one or more operational Wi-Fi settings for the access point device based on the variation in the one or more Wi-Fi performance parameters. Additionally, at 1640, when the cloud intelligence engine includes a database for storing the variation in the one or more Wi-Fi performance parameters relative to the adjustment in the one or more temporary Wi-Fi settings, the cloud intelligence engine may determine one or more second operational Wi-Fi settings for a second access point device based on the variation in the one or more Wi-Fi performance parameters.

In the present specification, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in this specification and annexed drawings should generally be construed to mean "one or more" unless specified otherwise or clear from context to be directed to a singular form.

In addition, the terms "example" and "such as" are utilized herein to mean serving as an instance or illustration. Any embodiment or design described herein as an "example" or referred to in connection with a "such as" clause is not necessarily to be construed as preferred or advantageous over other embodiments or designs. Rather, use of the terms "example" or "such as" is intended to present concepts in a concrete fashion. The terms "first," "second," "third," and so forth, as used in the claims and description, unless otherwise clear by context, is for clarity only and does not necessarily indicate or imply any order in time.

What has been described above includes examples of one or more embodiments of the disclosure. It is, of course, not possible to describe every conceivable combination of components or methodologies for purposes of describing these examples, and it can be recognized that many further combinations and permutations of the present embodiments are possible. Accordingly, the embodiments disclosed and/or claimed herein are intended to embrace all such alterations, modifications and variations that fall within the spirit and scope of the detailed description and the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising: a Wi-Fi coordinator device communicatively coupled to an access point and configured to receive packet information from one or more devices in range of the Wi-Fi coordinator device; and a cloud intelligence engine communicatively coupled to the Wi-Fi coordinator device and configured to receive the packet information, store the packet information, integrate the packet information with other packet information to generate integrated packet information, and determine one or more operational Wi-Fi settings for the access point device based at least on the integrated packet information; wherein, the packet information includes information selected from the group consisting of a packet envelope, packet header, packet type, packet size, retry bits, collision bits, flags, status, timestamp, data rate, channel, signal level, noise level, MAC header, Logical Link Control header, and IP, TCP, and HTTP data.

2. The system of claim 1, wherein the cloud intelligence engine is further configured to transmit the one or more operational Wi-Fi settings to the Wi-Fi coordinator device, and the Wi-Fi coordinator device is further configured to cause the access point to implement the one or more operational Wi-Fi settings.

3. The system of claim 1, wherein the Wi-Fi coordinator device is configured to send information about the access point to the cloud intelligence engine and the cloud intelligence engine is configured to determine the one or more operational Wi-Fi settings based on the access point information.

4. The system of claim 1, wherein the Wi-Fi coordinator device utilizes processing resources in the access point.

5. The system of claim 1, wherein the Wi-Fi coordinator does not utilize processing resources in the access point.

6. The system of claim 1, wherein the Wi-Fi coordinator device includes a DFS master device.

7. The system of claim 6, wherein the DFS master device is configured to switch a 5 GHz transceiver of the DFS master device to a channel of a plurality of 5 GHz communication channels, cause a beacon generator of the DFS master device to generate a beacon in the channel of the plurality of 5 GHz communication channels, and cause a radar detector of the DFS master device to scan for a radar signal in the channel of the plurality of 5 GHz communication channels.

8. The system of claim 1, wherein the one or more operational Wi-Fi settings is selected from the group consisting of channel, beacon interval, beamforming settings, Wi-Fi multimedia power save (WMMPS) compatibility, frame burst, delivery traffic indication message (DTIM) interval, fragmentation threshold, request to send (RTS) threshold, transmit (TX) antenna, receive (RX) antenna, preamble length, transmit (TX) power, Afterburner/Super G/Speedbooster, Bluetooth coexistence mode, wireless network mode, and sensitivity range (acknowledge (ACK) timing).

9. A system, comprising: a Wi-Fi coordinator device communicatively coupled to an access point and configured to receive packet information from one or more devices in range of the Wi-Fi coordinator device; and
a cloud intelligence engine communicatively coupled to the Wi-Fi coordinator device and configured to receive the packet information, store the packet information, integrate the packet information with other packet information to generate integrated packet information, and determine one or more operational Wi-Fi settings for the access point device based at least on the integrated packet information; wherein, the cloud intelligence engine and the Wi-Fi coordinator device are configured to cause the access point to adjust one or more temporary Wi-Fi settings, determine a variation in one or more Wi-Fi performance parameters relative to the adjustment in the one or more temporary Wi-Fi settings, and to determine the one or more operational Wi-Fi settings for the access point device based on the variation in the one or more Wi-Fi performance parameters.

10. The system of claim 9, wherein the cloud intelligence engine includes a database for storing the variation in the one or more Wi-Fi performance parameters relative to the adjustment in the one or more temporary Wi-Fi settings and wherein the cloud intelligence engine is configured to determine one or more second operational Wi-Fi settings for a second access point device based on the variation in the one or more Wi-Fi performance parameters.

11. The system of claim 9, wherein the one or more Wi-Fi performance parameters is selected from the group consisting of throughput, range, signal strength, error rate, collision rate, and output power.

12. A method, comprising: receiving, using Wi-Fi coordinator device communicatively coupled to an access point, packet information from one or more devices in range of the Wi-Fi coordinator device; receiving, using a cloud intelligence engine communicatively coupled to the Wi-Fi coordinator device, the packet information; storing, using the clout intelligence engine, the packet information; integrating, using the cloud intelligence engine, the packet information with other packet information to generate integrated packet information; determining, using the cloud intelligence engine, one or more operational Wi-Fi settings for the access point device based at least on the integrated packet information; causing, using the cloud intelligence engine and the Wi-Fi coordinator, the access point to adjust one or more temporary Wi-Fi settings; determining, using the cloud intelligence engine, a variation in one or more Wi-Fi performance parameters relative to the adjustment in the one or more temporary Wi-Fi settings; and determining, using the cloud intelligence engine, the one or more operational Wi-Fi settings for the access point device based on the variation in the one or more Wi-Fi performance parameters.

13. The method of claim 12, further comprising: transmitting, using the cloud intelligence engine, the one or more operational Wi-Fi settings to the Wi-Fi coordinator device; and causing, using the Wi-Fi coordinator device, the access point to implement the one or more operational Wi-Fi settings.

14. The method of claim 12, further comprising determining, using the cloud intelligence engine, the one or more operational Wi-Fi settings based on Wi-Fi standards information stored in at least one database.

15. The method of claim 12, further comprising determining, using the cloud intelligence engine, the one or more operational Wi-Fi settings based on regulatory information associated with the client devices.

16. The method of claim 12, further comprising: sending, using the Wi-Fi coordinator device, information about the access point to the cloud intelligence engine; and determining, using the cloud intelligence engine, the one or more operational Wi-Fi settings based on the access point information.

17. The method of claim 12, wherein the cloud intelligence engine includes a database for storing the variation in the one or more Wi-Fi performance parameters relative to the adjustment in the one or more temporary Wi-Fi settings and further comprising determining, using the cloud intelligence engine, one or more second operational Wi-Fi settings for a second access point device based on the variation in the one or more Wi-Fi performance parameters.

18. A system, comprising: an access point;
a Wi-Fi coordinator device communicatively coupled to the access point and configured to receive packet information from one or more devices in range of the Wi-Fi coordinator device;
and a cloud intelligence engine communicatively coupled to the Wi-Fi coordinator device and configured to receive the packet information, store the packet information, integrate the packet information with other packet information to generate integrated packet information, and determine one or more operational Wi-Fi settings for the access point device based at least on the integrated packet information; wherein, the packet information includes information selected from the group consisting of a packet envelope, packet header, packet type, packet size, retry bits, collision bits, flags, status, timestamp, data rate, channel, signal level, noise level, MAC header, Logical Link Control header, and IP, TCP, and HTTP data.

* * * * *